United States Patent
Cai et al.

(10) Patent No.: US 9,813,092 B2
(45) Date of Patent: Nov. 7, 2017

(54) SIGNAL PROCESSING METHOD AND APPARATUS

(71) Applicant: Huawei Technologies Co., Ltd., Shenzhen (CN)

(72) Inventors: Meng Cai, Chengdu (CN); Kun Li, Chengdu (CN); Hongli Jiang, Chengdu (CN); Yu Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/261,289

(22) Filed: Sep. 9, 2016

(65) Prior Publication Data

US 2016/0380659 A1 Dec. 29, 2016

Related U.S. Application Data

(63) Continuation of application No. PCT/CN2014/073210, filed on Mar. 11, 2014.

(51) Int. Cl.
*H04B 1/04* (2006.01)
*H04B 1/10* (2006.01)
(Continued)

(52) U.S. Cl.
CPC ............ *H04B 1/1027* (2013.01); *H04B 1/76* (2013.01); *H04B 7/04* (2013.01); *H04J 11/004* (2013.01); *H04J 11/005* (2013.01); *H04L 5/0073* (2013.01)

(58) Field of Classification Search
CPC .......... H04B 1/10; H04B 1/1027; H04B 1/76; H04L 5/00; H04L 4/0073; H04J 11/0005
(Continued)

(56) References Cited

U.S. PATENT DOCUMENTS 7,145,942 B1 * 12/2006 Ogawa ................ H01Q 3/2611
375/144
8,032,364 B1 * 10/2011 Watts .................. G10L 21/0208
704/226
(Continued)

FOREIGN PATENT DOCUMENTS

CN 1409901 A 4/2003
CN 101052219 A 10/2007
(Continued)

*Primary Examiner* — Sonny Trinh
(74) *Attorney, Agent, or Firm* — Leydig, Voit & Mayer, Ltd.

(57) ABSTRACT

A signal processing method and apparatus are disclosed. The signal processing method includes: receiving, by a first signal processing apparatus, a mixed signal; acquiring, by the first signal processing apparatus, an energy strength ratio of the mixed signal, where the energy strength ratio includes a ratio of energy strength of a signal sent by a first signal source and received by the first signal processing apparatus to energy strength of a signal sent by a second signal source and received by the first signal processing apparatus; and if the energy strength ratio is less than a first preset threshold, using, by the first signal processing apparatus, the signal sent by the second signal source in the mixed signal as an interference signal and separating the interference signal, and determining that a mixed signal obtained after the separation processing is the desired signal sent by the first signal source.

14 Claims, 12 Drawing Sheets

(51) Int. Cl.
*H04J 11/00* (2006.01)
*H04B 1/76* (2006.01)
*H04L 5/00* (2006.01)
*H04B 7/04* (2017.01)

(58) Field of Classification Search
USPC ..... 455/1, 63.1, 114.2, 278.1, 296; 375/144, 375/148, 346, 348
See application file for complete search history.

(56) References Cited

U.S. PATENT DOCUMENTS

| | | |
|---|---|---|
| 2007/0058698 A1 | 3/2007 | Ogawa et al. |
| 2012/0051476 A1 | 3/2012 | Shi et al. |
| 2013/0148538 A1 | 6/2013 | Ohwatari et al. |

FOREIGN PATENT DOCUMENTS

| | | |
|---|---|---|
| CN | 101150388 A | 3/2008 |
| CN | 101272188 A | 9/2008 |
| CN | 101383792 A | 3/2009 |
| CN | 101645864 A | 2/2010 |
| EP | 1863186 A2 | 12/2007 |
| EP | 2320587 A1 | 5/2011 |
| EP | 2448138 A2 | 5/2012 |
| WO | WO 02093784 A1 | 11/2002 |
| WO | WO 2004014031 A1 | 2/2004 |
| WO | WO 2011128326 A1 | 10/2011 |

\* cited by examiner

SIGNAL PROCESSING METHOD AND APPARATUS

CROSS-REFERENCE TO RELATED APPLICATIONS

This application is a continuation of International Application No. PCT/CN2014/073210, filed on Mar. 11, 2014, which is hereby incorporated by reference in its entirety.

TECHNICAL FIELD

The present disclosure relates to the field of electronic technologies and, in particular, to a signal processing method and apparatus.

BACKGROUND

With the development of communications network technologies, signal processing has become one important branch of the communications network technologies. In a communication process, during transmission of a signal, the signal is inevitably interfered with by an interference signal sent by another signal source, leading to poor quality of a signal received by a receive end, where a higher density of the another signal source indicates stronger interference to the signal, poorer quality of the signal received by the receive end, and poorer communication quality. For example, a signal received by an antenna on a pole is a mixed signal that is interfered with, where the mixed signal includes a desired signal needing to be received and an interference signal sent by another antenna. When there are a relatively large quantity of antennas on the pole, intense adjacent-channel interference is generated; in this case, the interference signal included in the received mixed signal has excessively large energy strength, and the receive end cannot recognize the desired signal from the mixed signal. In order to reduce adjacent-channel interference, so that the receive end can recognize the desired signal from the mixed signal, in an existing processing method, a global power adjustment solution is used. That is, power used by some antennas to send desired signals is reduced, so as to reduce interference to receiving of the desired signals by other antennas. In this way, the interference signal included in the mixed signal received by the receive end has relatively small energy strength, so that the receive end can recognize the desired signal from the mixed signal. In the processing method, although adjacent-channel interference can be reduced, so that the receive end can recognize the desired signal from the mixed signal, receiving quality of the desired signal is affected; therefore, the method is not practical.

SUMMARY

Embodiments of the present disclosure provide a signal processing method and apparatus, where not only an interference signal can be separated from a received mixed signal, and a desired signal is further recognized from the mixed signal, but also receiving quality of the desired signal is not affected; therefore, the method is practical and highly-efficient.

A first aspect of the present disclosure provides a signal processing method, which may include:

receiving, by a first signal processing apparatus, a mixed signal;

acquiring, by the first signal processing apparatus, an energy strength ratio according to the mixed signal, where the energy strength ratio includes a ratio of energy strength of a signal sent by a first signal source and received by the first signal processing apparatus to energy strength of a signal sent by a second signal source and received by the first signal processing apparatus; and if the energy strength ratio is less than a first preset threshold, using, by the first signal processing apparatus, the signal sent by the second signal source in the mixed signal as an interference signal and separating the interference signal, and determining that a mixed signal obtained after the separation processing is the desired signal sent by the first signal source.

Based on the first aspect, in a first feasible implementation manner, the acquiring, by the first signal processing apparatus, an energy strength ratio according to the mixed signal includes:

acquiring, by the first signal processing apparatus, energy strength of the mixed signal;

acquiring, by the first signal processing apparatus, an isolation of the first signal processing apparatus relative to a second signal processing apparatus, where the second signal processing apparatus is a processing apparatus that acquires a desired signal sent by the second signal source;

acquiring, by the first signal processing apparatus, energy strength of a desired reference signal corresponding to the second signal source, where the desired reference signal corresponding to the second signal source is a signal obtained after coding and modulation processing is performed on the desired signal sent by the second signal source;

calculating, by the first signal processing apparatus according to the energy strength of the mixed signal, the isolation, and the energy strength of the desired reference signal corresponding to the second signal source, the energy strength of the signal sent by the first signal source and received by the first signal processing apparatus and the energy strength of the signal sent by the second signal source and received by the first signal processing apparatus; and calculating, by the first signal processing apparatus, the ratio of the energy strength of the signal sent by the first signal source and received by the first signal processing apparatus to the energy strength of the signal sent by the second signal source and received by the first signal processing apparatus.

Based on the first aspect, in a second feasible implementation manner, the using, by the first signal processing apparatus, the signal sent by the second signal source in the mixed signal as an interference signal and separating the interference signal includes:

acquiring, by the first signal processing apparatus, a desired reference signal corresponding to the second signal source;

performing, by the first signal processing apparatus, interference reconstruction on the desired reference signal corresponding to the second signal source, to obtain the interference signal sent by the second signal source; and recognizing, by the first signal processing apparatus, a signal that is the same as the interference signal sent by the second signal source and that is in the mixed signal as the signal sent by the second signal source, and using the signal sent by the second signal source in the mixed signal as the interference signal and separating the interference signal.

Based on the second feasible implementation manner of the first aspect, in a third feasible implementation manner, the performing, by the first signal processing apparatus, interference reconstruction on the desired reference signal corresponding to the second signal source, to obtain the interference signal sent by the second signal source includes:

processing, by the first signal processing apparatus by using a preset interference channel reconstruction algorithm, the desired reference signal corresponding to the second signal source, to obtain a reconstructed interference signal; and processing, by the first signal processing apparatus, the reconstructed interference signal by using a preset phase tracking algorithm, so as to remove phase noise from the reconstructed interference signal and obtain the interference signal sent by the second signal source.

Based on the second feasible implementation manner of the first aspect, in a fourth feasible implementation manner, before the acquiring, by the first signal processing apparatus, a desired reference signal corresponding to the second signal source, the method further includes:

acquiring, by the first signal processing apparatus, a bit error rate of a desired signal sent by the second signal source; and if the bit error rate is less than a second preset threshold, acquiring, by the first signal processing apparatus, the desired reference signal corresponding to the second signal source.

Based on the second feasible implementation manner of the first aspect or the fourth feasible implementation manner of the first aspect, in a fifth feasible implementation manner, the acquiring, by the first signal processing apparatus, a desired reference signal corresponding to the second signal source includes:

receiving, by the first signal processing apparatus, the desired reference signal sent by a second signal processing apparatus and corresponding to the second signal source.

Based on the fifth feasible implementation manner of the first aspect, in a sixth feasible implementation manner, after the determining, by the first signal processing apparatus, that a mixed signal obtained after the separation processing is the desired signal sent by the first signal source, the method further includes:

performing, by the first signal processing apparatus, coding and modulation on the desired signal sent by the first signal source, to obtain a desired reference signal corresponding to the first signal source; and sending, by the first signal processing apparatus, the desired reference signal corresponding to the first signal source to the second signal processing apparatus, so that the second signal processing apparatus performs interference reconstruction on the desired reference signal corresponding to the first signal source, to obtain an interference signal sent by the first signal source, and the second signal processing apparatus separates, from a mixed signal received by the second signal processing apparatus, a signal the same as the interference signal sent by the first signal source.

Based on the first aspect, the first feasible implementation manner of the first aspect, the second feasible implementation manner of the first aspect, the third feasible implementation manner of the first aspect, the fourth feasible implementation manner of the first aspect, the fifth feasible implementation manner of the first aspect, or the sixth feasible implementation manner of the first aspect, in a seventh feasible implementation manner, the method further includes:

performing, by the first signal processing apparatus, channel equalization processing on the desired signal sent by the first signal source, so as to cancel intersymbol interference in the desired signal sent by the first signal source;

adjusting, by the first signal processing apparatus, a phase deviation of the desired signal obtained after the channel equalization processing and sent by the first signal source, to obtain a desired signal after phase adjustment;

comparing, by the first signal processing apparatus, the desired signal obtained after the phase adjustment with a signal of a standard constellation diagram, converting the desired signal obtained after the phase adjustment into preset multi-level modulation data, and outputting an error signal between the desired signal obtained after the phase adjustment and the signal of the standard constellation diagram;

updating, by the first signal processing apparatus, the channel equalization coefficient according to the error signal, and performing, according to the updated channel equalization coefficient, channel equalization processing on the desired signal sent by the first signal source, to reduce an error between the desired signal obtained after the phase adjustment and the signal of the standard constellation diagram; and determining, by the first signal processing apparatus, that the error signal is a phase update deviation, and adjusting, according to the phase update deviation, a phase deviation of the desired signal obtained after the channel equalization processing and sent by the first signal source, so as to reduce the error between the desired signal obtained after the phase adjustment and the signal of the standard constellation diagram.

A second aspect of the present disclosure provides a signal processing apparatus, which may include:

a receiving module, configured to receive a mixed signal;

a ratio acquiring module, configured to acquire an energy strength ratio according to the mixed signal, where the energy strength ratio includes a ratio of energy strength of a signal sent by a first signal source and received by the signal processing apparatus to energy strength of a signal sent by a second signal source and received by the signal processing apparatus; and a separation module, configured to: if the energy strength ratio is less than a first preset threshold, use the signal sent by the second signal source in the mixed signal as an interference signal and separate the interference signal, and determine that a mixed signal obtained after the separation processing is the desired signal sent by the first signal source.

Based on the second aspect, in a first feasible implementation manner, the ratio acquiring module includes:

a first acquiring unit, configured to acquire energy strength of the mixed signal;

a second acquiring unit, configured to acquire an isolation of the first signal processing apparatus relative to a target signal processing apparatus, where the target signal processing apparatus is a processing apparatus that acquires a desired signal sent by the second signal source;

a third acquiring unit, configured to acquire energy strength of a desired reference signal corresponding to the second signal source, where the desired reference signal corresponding to the second signal source is a signal obtained after coding and modulation processing is performed on the desired signal sent by the second signal source;

a first calculation unit, configured to calculate, according to the energy strength of the mixed signal, the isolation, and the energy strength of the desired reference signal corresponding to the second signal source, the energy strength of the signal sent by the first signal source and received by the first signal processing apparatus and the energy strength of the signal sent by the second signal source and received by the first signal processing apparatus; and a second calculation unit, configured to calculate the ratio of the energy strength of the signal sent by the first signal source and received by the first signal processing apparatus to the energy strength of the signal sent by the second signal source and received by the first signal processing apparatus.

Based on the second aspect, in a second feasible implementation manner, the separation module includes:

a fourth acquiring unit, configured to acquire a desired reference signal corresponding to the second signal source, where the desired reference signal corresponding to the second signal source is a signal obtained after coding and modulation processing is performed on a desired signal sent by the second signal source;

a reconstruction unit, configured to perform interference reconstruction on the desired reference signal corresponding to the second signal source, to obtain the interference signal sent by the second signal source;

a separation unit, configured to recognize a signal that is the same as the interference signal sent by the second signal source and that is in the mixed signal as the signal sent by the second signal source, and use the signal sent by the second signal source in the mixed signal as the interference signal and separate the interference signal; and a determining unit, configured to determine that a mixed signal obtained after the separation processing is the desired signal sent by the first signal source.

Based on the second feasible implementation manner of the second aspect, in a third feasible implementation manner, the reconstruction unit includes:

an interference channel estimator, configured to process, by using a preset interference channel reconstruction algorithm, the desired reference signal corresponding to the second signal source, to obtain a reconstructed interference signal; and a first phase noise suppressor, configured to process the reconstructed interference signal by using a preset phase tracking algorithm, so as to remove phase noise from the reconstructed interference signal and obtain the interference signal sent by the second signal source.

Based on the second feasible implementation manner of the second aspect, in a fourth feasible implementation manner, the apparatus further includes:

an acquiring module, configured to acquire a bit error rate of the desired signal sent by the second signal source, where the fourth acquiring unit is configured to: if the bit error rate is less than a second preset threshold, acquire the desired reference signal corresponding to the second signal source.

Based on the second feasible implementation manner of the second aspect or the fourth feasible implementation manner of the second aspect, in a fifth feasible implementation manner, the fourth acquiring unit is specifically configured to receive the desired reference signal sent by the target signal processing apparatus and corresponding to the second signal source.

Based on the fifth feasible implementation manner of the second aspect, in a sixth feasible implementation manner, the apparatus further includes:

a coding and modulation module, configured to perform coding and modulation on the desired signal sent by the first signal source, to obtain a desired reference signal corresponding to the first signal source; and a sending module, configured to send the desired reference signal corresponding to the first signal source to the target signal processing apparatus, so that the target signal processing apparatus performs interference reconstruction on the desired reference signal corresponding to the first signal source, to obtain an interference signal sent by the first signal source, and the target signal processing apparatus separates, from a mixed signal received by the target signal processing apparatus, a signal the same as the interference signal sent by the first signal source.

Based on the second aspect, the first feasible implementation manner of the second aspect, the second feasible implementation manner of the second aspect, the third feasible implementation manner of the second aspect, the fourth feasible implementation manner of the second aspect, the fifth feasible implementation manner of the second aspect, or the sixth feasible implementation manner of the second aspect, in a seventh feasible implementation manner, the apparatus further includes a desired signal equalizer, a second phase noise suppressor, and a decider, where the desired signal equalizer is separately connected to the separation unit, the first phase noise suppressor, and the second phase noise suppressor, and the second phase noise suppressor is separately connected to the decider and the first phase noise suppressor, where the desired signal equalizer is configured to perform channel equalization processing on the desired signal sent by the first signal source, to cancel intersymbol interference in the desired signal sent by the first signal source;

the second phase noise suppressor is configured to adjust a phase deviation of the desired signal obtained after the channel equalization processing and sent by the first signal source, to obtain a desired signal after phase adjustment;

the decider is configured to compare the desired signal obtained after the phase adjustment with a signal of a standard constellation diagram, convert the desired signal obtained after the phase adjustment into preset multi-level modulation data, and output an error signal between the desired signal obtained after the phase adjustment and the signal of the standard constellation diagram;

the desired signal equalizer is further configured to update the channel equalization coefficient according to the error signal, and performing, according to the updated channel equalization coefficient, channel equalization processing on the desired signal sent by the first signal source, to reduce an error between the desired signal obtained after the phase adjustment and the signal of the standard constellation diagram; and the second phase noise suppressor is further configured to determine that the error signal is a phase update deviation, and adjust, according to the phase update deviation, a phase deviation of the desired signal obtained after the channel equalization processing and sent by the first signal source, so as to reduce the error between the desired signal obtained after the phase adjustment and the signal of the standard constellation diagram.

A third aspect of the present disclosure provides a signal processing apparatus, which may include a receiver and a processor, where the receiver is configured to receive a mixed signal;

the processor is configured to acquire an energy strength ratio according to the mixed signal, where the energy strength ratio includes a ratio of energy strength of a signal sent by a first signal source and received by the signal processing apparatus to energy strength of a signal sent by a second signal source and received by the signal processing apparatus; and the processor is further configured to: if the energy strength ratio is less than a first preset threshold, use the signal sent by the second signal source in the mixed signal as an interference signal and separate the interference signal, and determine that a mixed signal obtained after the separation processing is the desired signal sent by the first signal source.

Based on the third aspect, in a first feasible implementation manner, the processor is further configured to acquire energy strength of the mixed signal;

the processor is further configured to acquire an isolation of the local signal processing apparatus relative to a target signal processing apparatus, where the target signal processing apparatus is a processing apparatus that acquires a desired signal sent by the second signal source;

the processor is further configured to acquire energy strength of a desired reference signal corresponding to the second signal source, where the desired reference signal corresponding to the second signal source is a signal obtained after coding and modulation processing is performed on the desired signal sent by the second signal source;

the processor is further configured to calculate, according to the energy strength of the mixed signal, the isolation, and the energy strength of the desired reference signal corresponding to the second signal source, the energy strength of the signal sent by the first signal source and received by the signal processing apparatus and the energy strength of the signal sent by the second signal source and received by the first signal processing apparatus; and the processor is further configured to calculate the ratio of the energy strength of the signal sent by the first signal source and received by the first signal processing apparatus to the energy strength of the signal sent by the second signal source and received by the first signal processing apparatus.

Based on the third aspect, in a second feasible implementation manner, the receiver is further configured to: if the energy strength ratio is less than the first preset threshold, acquire a desired reference signal corresponding to the second signal source;

the processor is further configured to perform interference reconstruction on the desired reference signal corresponding to the second signal source, to obtain the interference signal sent by the second signal source; and the processor is further configured to recognize a signal that is the same as the interference signal sent by the second signal source and that is in the mixed signal as the signal sent by the second signal source, and use the signal sent by the second signal source in the mixed signal as the interference signal and separate the interference signal.

Based on the second feasible implementation manner of the third aspect, in a third feasible implementation manner, the processor is further configured to process, by using a preset interference channel reconstruction algorithm, the desired reference signal corresponding to the second signal source, to obtain a reconstructed interference signal; and the processor is further configured to process the reconstructed interference signal by using a preset phase tracking algorithm, so as to remove phase noise from the reconstructed interference signal and obtain the interference signal sent by the second signal source.

Based on the second feasible implementation manner of the third aspect, in a fourth feasible implementation manner, the processor is further configured to acquire a bit error rate of the desired signal sent by the second signal source; and the processor is further configured to: if the bit error rate is less than a second preset threshold, acquire the desired reference signal corresponding to the second signal source.

Based on the second feasible implementation manner of the third aspect or the fourth feasible implementation manner of the second aspect, in a fifth feasible implementation manner, the receiver is further configured to receive the desired reference signal sent by the target signal processing apparatus and corresponding to the second signal source.

Based on the fifth feasible implementation manner of the third aspect, in a sixth feasible implementation manner, the apparatus further includes a transmitter, where the processor is further configured to perform coding and modulation on the desired signal sent by the first signal source, to obtain a desired reference signal corresponding to the first signal source; and the transmitter is configured to send the desired reference signal corresponding to the first signal source to the target signal processing apparatus, so that the target signal processing apparatus performs interference reconstruction on the desired reference signal corresponding to the first signal source, to obtain an interference signal sent by the first signal source, and the target signal processing apparatus separates, from a mixed signal received by the target signal processing apparatus, a signal the same as the interference signal sent by the first signal source.

Based on the third aspect, the first feasible implementation manner of the third aspect, the second feasible implementation manner of the third aspect, the third feasible implementation manner of the third aspect, the fourth feasible implementation manner of the third aspect, the fifth feasible implementation manner of the third aspect, or the sixth feasible implementation manner of the third aspect, in a seventh feasible implementation manner, the processor is further configured to perform channel equalization processing on the desired signal sent by the first signal source, to cancel intersymbol interference in the desired signal sent by the first signal source;

the processor is further configured to adjust a phase deviation of the desired signal obtained after the channel equalization processing and sent by the first signal source, to obtain a desired signal after phase adjustment;

the processor is further configured to compare the desired signal obtained after the phase adjustment with a signal of a standard constellation diagram, convert the desired signal obtained after the phase adjustment into preset multi-level modulation data, and output an error signal between the desired signal obtained after the phase adjustment and the signal of the standard constellation diagram;

the processor is further configured to update the channel equalization coefficient according to the error signal, and perform, according to the updated channel equalization coefficient, channel equalization processing on the desired signal sent by the first signal source, to reduce an error between the desired signal obtained after the phase adjustment and the signal of the standard constellation diagram; and the processor is further configured to determine that the error signal is a phase update deviation, and adjust, according to the phase update deviation, a phase deviation of the desired signal obtained after the channel equalization processing and sent by the first signal source, so as to reduce the error between the desired signal obtained after the phase adjustment and the signal of the standard constellation diagram.

In the embodiments of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

BRIEF DESCRIPTION OF DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a first signal processing apparatus and a second signal processing apparatus may be antenna apparatuses, and a first signal source and a second signal source may be antenna apparatuses. When an antenna apparatus sends a signal, the antenna apparatus is a signal source; when an antenna apparatus receives a signal, the antenna apparatus is a signal processing apparatus. A signal sent by the first signal source and received by the first signal processing apparatus may be a desired signal received by the first signal processing apparatus, and a signal sent by the second signal source and received by the first signal processing apparatus may be an interference signal received by the first signal processing apparatus. The signal processing method may be applied to an antenna apparatus to perform interference cancellation on a received mixed signal, so as to improve quality of a received signal, and meanwhile improve a density of the antenna apparatus and improve communication quality.

The signal processing method provided in the embodiments of the present disclosure is described below in detail with reference to FIG. 1 to FIG. 9.

Figure 1:
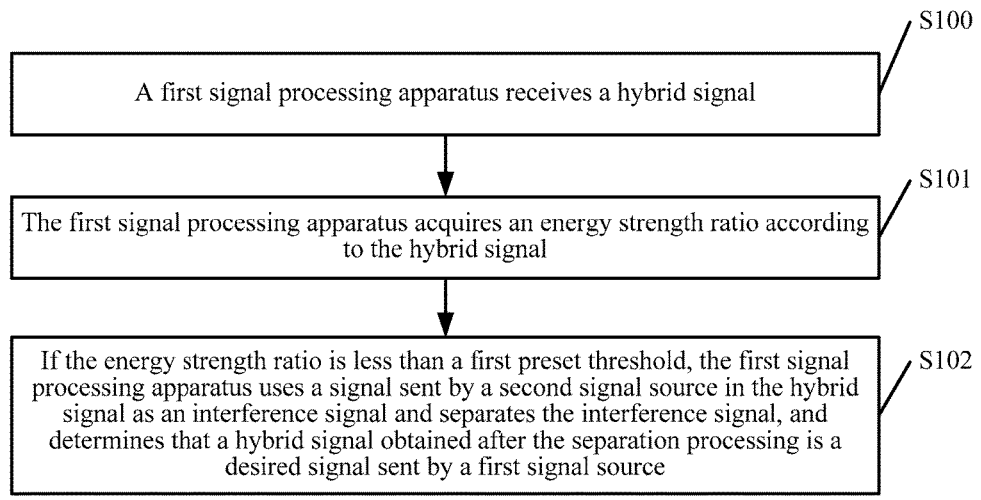
FIG. 1 is a schematic flowchart of a signal processing method according to the present disclosure.

Refer to FIG. 1, which is a schematic flowchart of a signal processing method according to an embodiment of the present disclosure. The method may include the following step S100 to step S102:

S100: A first signal processing apparatus receives a mixed signal.

In a specific embodiment, the first signal processing apparatus may be an antenna apparatus, and the antenna apparatus may include an indoor unit (IDU) and an outdoor unit (ODU), where the outdoor unit ODU in the antenna apparatus receives the mixed signal, and the indoor unit IDU processes the received mixed signal. It should be noted that the mixed signal may include a desired signal that is sent by a first signal source and that the first signal processing apparatus needs to receive, and may also include an interference signal sent by a second signal source and received by the first signal processing apparatus, and further, may also include a noise signal. The second signal source may be all signal sources except the first signal source.

Figure 2:
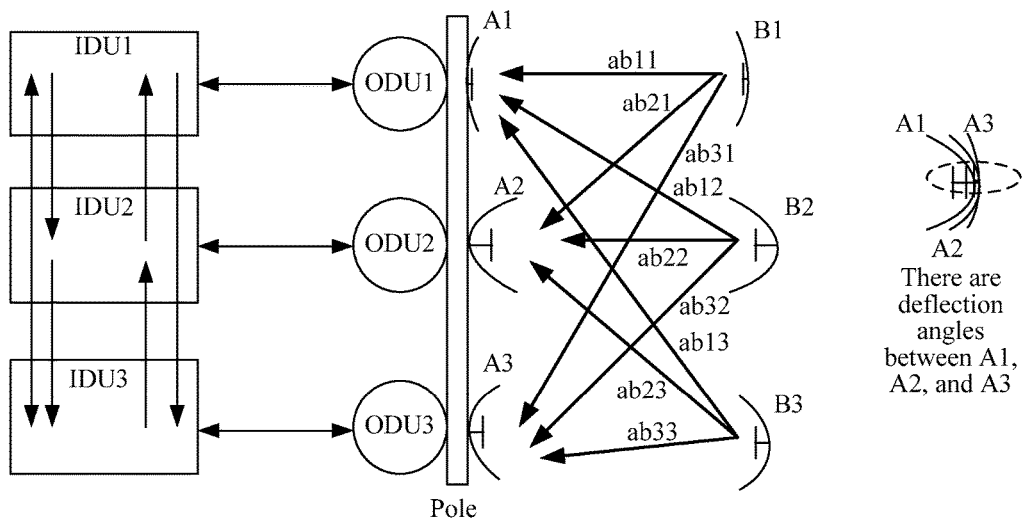
FIG. 2 is a diagram of a signal processing application scenario according to the present disclosure.

Further, refer to FIG. 2, which is a diagram of an application scenario in which the first signal processing apparatus receives the mixed signal according to this embodiment of the present disclosure.

In FIG. 2, when an antenna A1 is the first signal processing apparatus, an antenna B1 is the first signal source, an antenna B2 or an antenna B3 is the second signal source, and the mixed signal received by the antenna A1 not only includes a desired signal ab11 sent by the antenna B1, but also includes interference signals ab12 and ab13 that are sent by the antenna B2 and the antenna B3. When an antenna A2 is the first signal processing apparatus, an antenna B2 is the first signal source, an antenna B1 or an antenna B3 is the second signal source, and the mixed signal received by the antenna A2 not only includes a desired signal ab22 sent by the antenna B2, but also includes interference signals ab21 and ab23 that are sent by the antenna B1 and the antenna B3. When an antenna A3 is the first signal processing apparatus, an antenna B3 is the first signal source, an antenna B1 or an antenna B2 is the second signal source, and the mixed signal received by the antenna A3 not only includes a desired signal ab33 sent by the antenna B3, but also includes interference signals ab31 and ab32 that are sent by the antenna B1 and the antenna B2.

Each of the antennas A1, A2, and A3 includes an indoor unit IDU and an outdoor unit ODU, for example, the antenna A1 includes an indoor unit IDU1 and an outdoor unit ODU1, the antenna A2 includes an indoor unit IDU2 and an outdoor unit ODU2, and the antenna A3 includes an indoor unit IDU3 and an outdoor unit ODU3. The outdoor unit ODU is configured to receive a mixed signal, and the indoor unit IDU is configured to process the received mixed signal. As shown in FIG. 2, there are deflection angles between the antennas A1, A2, and A3; therefore, there are isolations between the antennas, that is, energy strength received by the antennas when the antennas receive signals sent by signal sources are different. For example, in the mixed signal received by the antenna A1, a signal sent by the signal source B1 is the strongest, a signal sent by the signal source B2 is the second strongest, and a signal sent by the signal source B3 is the weakest.

Further, signal interworking may be performed between antennas on a pole. As shown in FIG. 2, the outdoor unit ODU1 in the antenna A1 receives a mixed signal and transmits the mixed signal to the indoor unit IDU1 for processing, and the indoor unit IDU1 may separately transmit a processed signal to the indoor unit IDU2 and the indoor unit IDU3. The outdoor unit ODU2 in the antenna A2 receives a mixed signal and transmits the mixed signal to the indoor unit IDU2 for processing, and the indoor unit IDU2 may separately transmit a processed signal to the indoor unit IDU1 and the indoor unit IDU3. The outdoor unit ODU3 in the antenna A3 receives a mixed signal and transmits the mixed signal to the indoor unit IDU3 for processing, and the indoor unit IDU3 may separately transmit a processed signal to the indoor unit IDU2 and the indoor unit IDU1.

S101: The first signal processing apparatus acquires an energy strength ratio according to the mixed signal, where the energy strength ratio includes a ratio of energy strength of a signal sent by a first signal source and received by the first signal processing apparatus to energy strength of a signal sent by a second signal source and received by the first signal processing apparatus.

In a specific embodiment, the first signal processing apparatus further processes the received mixed signal, to obtain the ratio of the energy strength of the signal sent by the first signal source and received by the first signal processing apparatus to the energy strength of the signal sent by the second signal source and received by the first signal processing apparatus in the mixed signal. The energy strength ratio may be specifically acquired through calculation according to energy strength of the mixed signal and an isolation between the first signal processing apparatus and a second signal processing apparatus. The signal sent by the first signal source may be a desired signal that the first signal processing apparatus needs to receive. The signal sent by the second signal source may be an interference signal received by the first signal processing apparatus. A degree of impact of the interference signal on the desired signal may be acquired according to a ratio of energy strength of the desired signal to energy strength of the interference signal. When the interference signal has a relatively high degree of impact on the desired signal, the energy strength ratio is relatively small; when the interference signal has a relatively low degree of impact on the desired signal, the energy strength ratio is relatively large.

Further, before acquiring the energy strength ratio according to the mixed signal, the first signal processing apparatus may further perform synchronization processing on all signals included in the mixed signal. It should be noted that the synchronization processing is merely an optional implementation step, to reduce an error when combined cancellation is performed on the mixed signal and a reconstructed interference signal.

Herein, a process in which an antenna apparatus performs synchronization processing on the received mixed signal is used as an example for description. For specific synchronization steps, refer to FIG. 3 and FIG. 4. Steps are separately explained and described below.

S10: Detect energy strength of the received mixed signal.

S11: Calculate a signal to interference ratio (SIR) of the mixed signal according to the energy strength of the mixed signal and an isolation between the first signal processing apparatus and a second signal processing apparatus.

Specifically, the signal to interference ratio of the mixed signal is SIR=10 lg S/N, where S is energy strength of a desired signal, N is energy strength of an interference signal, and the energy strength may be represented by power. In this embodiment of the present disclosure, S is the energy strength of the signal sent by the first signal source and received by the first signal processing apparatus, and N is the energy strength of the signal sent by the second signal source and received by the first signal processing apparatus. For a method of calculating the energy strength of the signal sent by the first signal source and received by the first signal processing apparatus and a method of calculating the energy strength of the signal sent by the second signal source and received by the first signal processing apparatus, refer to step S202, step S203, and step S204 in FIG. 3, and no further details are described herein.

S12: Determine whether the signal to interference ratio SIR of the mixed signal is greater than or equal to 0. If yes, perform step S13 and step S14; if not, perform step S17 and step S18.

S13: Perform framing by using a preamble of the mixed signal, and perform step S20.

When the signal to interference ratio SIR of the mixed signal is greater than or equal to 0, the energy strength of the desired signal in the mixed signal is relatively large. Therefore, when framing is performed on the desired signal in the mixed signal, framing may be performed directly by using the preamble of the mixed signal, and a frame indication signal of the desired signal is output.

S14: Detect a minimum mean square error (MSE) of a receive end, and determine whether the minimum mean square error reaches a demodulation threshold. If yes, perform step S15; if not, perform step S16.

Because the signal to interference ratio SIR of the mixed signal is greater than or equal to 0, the energy strength of the desired signal in the mixed signal is greater than the energy strength of the interference signal, and in this case, it is inaccurate to perform framing directly based on the interference signal. Therefore, when framing is performed on the interference signal, processing needs to be performed. A specific processing process may be: mixing the mixed signal with a reference signal corresponding to the second signal source, and continuously detecting whether a minimum mean square error MSE of a signal obtained after mixing processing reaches the demodulation threshold; if not, performing step S16; or if yes, aligning the interference signal in the mixed signal with a desired reference signal corresponding to the second signal source, and performing step S15.

S15: Output a frame indication signal of an interference signal.

Framing is performed by using a preamble of the adjusted desired reference signal corresponding to the second signal source, and the frame indication signal of the interference signal is output.

S16: Increase or decrease a signal delay of a desired reference signal corresponding to the second signal source, to adjust a preamble of the desired reference signal corresponding to the second signal source.

S17: Perform framing by using a preamble of the interference signal, and perform step S15.

When the signal to interference ratio SIR of the mixed signal is less than 0, the energy strength of the interference signal in the mixed signal is relatively large. Therefore, when framing is performed on the interference signal in the mixed signal, framing may be performed directly by using the preamble of the desired reference signal corresponding to the second signal source, and the frame indication signal of the interference signal is output. Because the preamble of the interference signal in the mixed signal is the same as the preamble of the desired reference signal corresponding to the second signal source, framing may be performed directly by using the preamble of the desired reference signal corresponding to the second signal source.

S18: Perform filtering of "the interference cancellation energy minimum principle" by using an equalizer, to obtain a roughly reconstructed desired signal.

When framing is performed on the desired signal in the mixed signal, the desired reference signal corresponding to the second signal source is input to the equalizer, to perform rough reconstruction on the desired signal. A specific process is: continuously performing iteration by using the desired signal error minimum principle and a cost function of the principle, so that cos of a filter tap coefficient is the smallest, where the cost function of the principle is:

$$\cos = \|r - d\_out\|^2,$$

where r is a mixed signal; during a first iteration, d_out is the desired reference signal corresponding to the second signal source; after each iteration, a channel matrix h is generated and d_out=I*h, where I is the desired reference signal corresponding to the second signal source. Considering impact of phase noise and a frequency offset, a phase locked loop needs to be added after the equalizer to suppress the frequency offset and the phase noise. When the system is convergent, that is, when cos is the smallest, the roughly reconstructed desired signal s=r−d_out is output.

S19: Perform self-adaptive threshold adjustment, and perform frame synchronization calculation.

Figure 4:
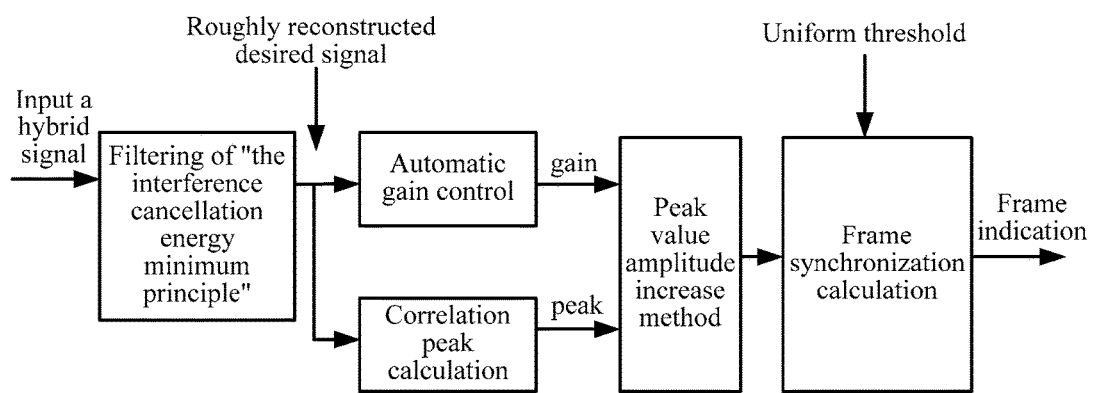
FIG. 4 is a block diagram of a threshold adjustment process according to an embodiment of the present disclosure.

For a specific processing process, refer to description in FIG. 4. As shown in FIG. 4, a signal obtained after filtering processing of "the interference cancellation energy minimum principle" in step S18 is the roughly reconstructed desired signal. When the interference is relatively large, and when the SIR changes, the energy strength of the desired signal also changes continuously. It is impossible to determine a synchronization threshold by using a uniform threshold. To resolve the foregoing problem, on the one hand, automatic gain control is performed on the roughly reconstructed desired signal, that is, the roughly reconstructed desired signal is amplified, and it is assumed that an amplified signal is gain; on the other hand, correlation peak calculation is performed, that is, correlation peak calculation is performed on the roughly reconstructed desired signal, and it is assumed that a signal obtained after the correlation peak calculation is peak. Then, a peak value increase method is used for processing, where the peak value increase method may be represented as f(gain, peak)=peak*gain^2. In this way, when SIRs are different, closer peak values are obtained, so that it is possible to use a uniform threshold. Then, frame synchronization calculation is performed on a signal obtained after processing is performed by using the peak value increase method, that is, correlation peak value calculation is performed. A calculation result is compared with a uniform threshold, to obtain a frame header of the roughly reconstructed desired signal, and output the frame indication signal of the desired signal.

S20: Output a frame indication signal of a desired signal.

S102: If the energy strength ratio is less than a first preset threshold, the first signal processing apparatus uses the signal sent by the second signal source in the mixed signal as an interference signal and separates the interference signal, and determines that a mixed signal obtained after the separation processing is the desired signal sent by the first signal source.

In a specific embodiment, the first preset threshold is determined by a user according to an actual case, and the first preset threshold may be a threshold of a receiving signal to noise ratio of the first signal processing apparatus (the threshold may be obtained through querying according to a specific encoding mode in the communications system). The signal sent by the second signal source is the interference signal received by the first signal processing apparatus. The ratio of the energy strength of the desired signal to the energy strength of the interference signal reflects a degree of impact of the interference signal on the desired signal. When the energy strength is less than the first preset threshold, it indicates that the interference signal has a relatively high degree of impact on the desired signal; therefore, the first signal processing apparatus uses the signal sent by the second signal source in the mixed signal as the interference signal and separates the interference signal. A specific separation process may be: acquiring the desired reference signal corresponding to the second signal source from the second signal processing apparatus, performing interference reconstruction on the desired signal corresponding to the second signal source, and recovering the interference signal sent by the second signal source and received by the first signal processing apparatus, where a signal obtained after the interference signal sent by the second signal source is separated from the mixed signal is the desired signal sent by the first signal source. It should be noted that the second signal processing apparatus stores the desired reference signal corresponding to the second signal source.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Figure 5:
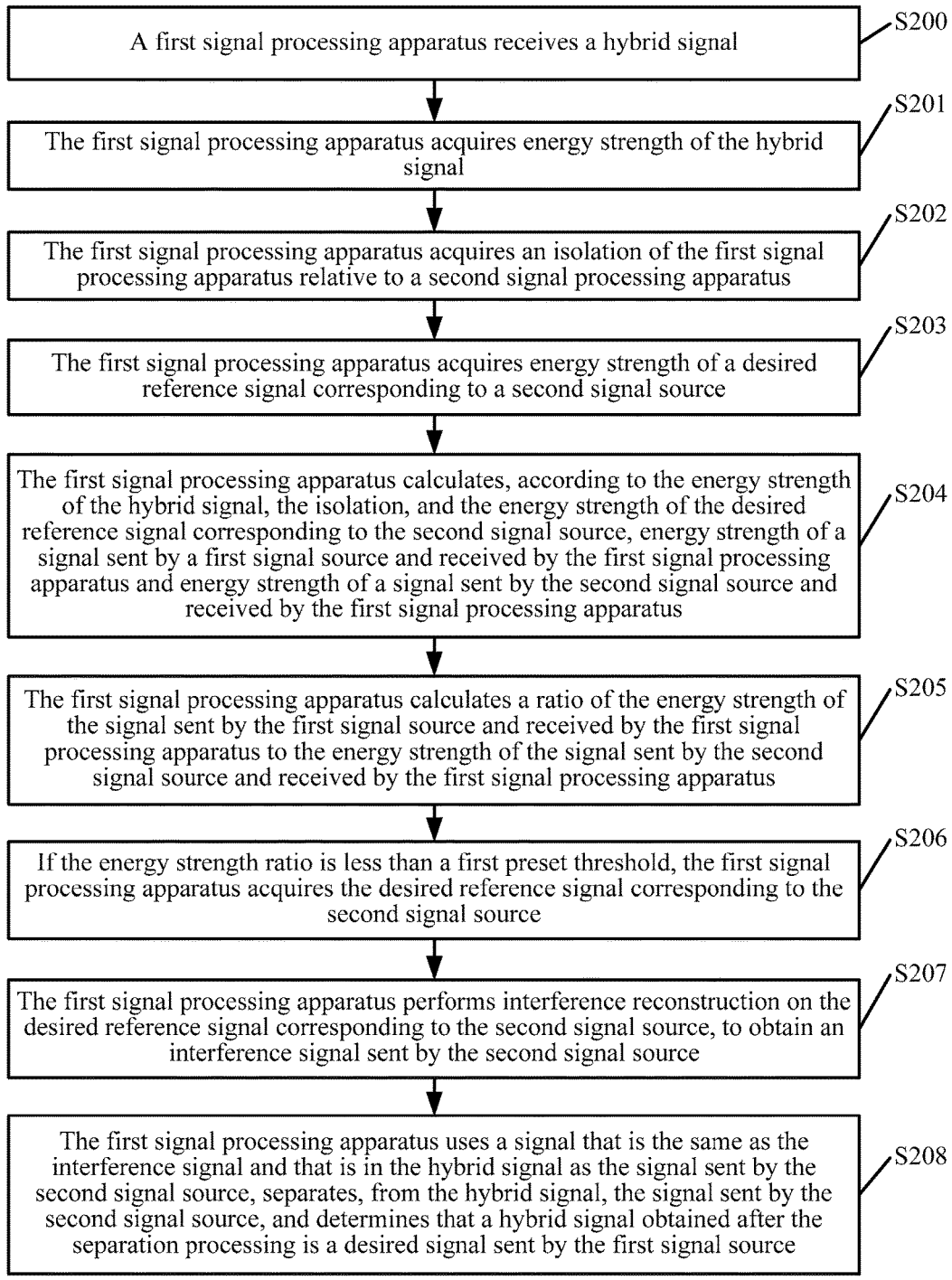
FIG. 5 is a schematic flowchart of another signal processing method according to the present disclosure.

Refer to FIG. 5, which is a schematic flowchart of another signal processing method according to an embodiment of the present disclosure. The method may include the following step S200 to step S208:

S200: A first signal processing apparatus receives a mixed signal.

In a specific embodiment, for step S200 in this embodiment of the present disclosure, reference may be made to step S100 shown in FIG. 1, and no further details are described herein again.

S201: The first signal processing apparatus acquires energy strength of the mixed signal.

In a specific embodiment, the first signal processing apparatus may be an antenna apparatus, and the first signal processing apparatus measures energy strength of the received mixed signal, where the energy strength of the mixed signal may be power of the mixed signal, or may be energy of the mixed signal.

S202: The first signal processing apparatus acquires an isolation of a second signal processing apparatus relative to the first signal apparatus, where the second signal processing apparatus is a processing apparatus that acquires a desired signal sent by a second signal source.

In a specific embodiment, the second signal processing apparatus and the first signal processing apparatus may be antenna apparatuses, and the second signal processing apparatus is a processing apparatus that acquires, from a mixed signal received by the second signal processing apparatus, the desired signal sent by the second signal source, and corresponds to the second signal source, for example, an antenna A2 or A3 in FIG. 2. The isolation of the second signal processing apparatus relative to the first signal processing apparatus reflects angles between different antenna apparatuses. A manner of acquiring the isolation of the second signal processing apparatus relative to the first signal processing apparatus may be: still using FIG. 2 as an example for description herein, turn on a first signal source B2, turn off signal sources B1 and B3, turn on an outdoor unit ODU1 of an antenna A1, detect that energy strength of a received signal is C1, turn on an outdoor unit ODU2 of the antenna A2, detect that energy strength of the received signal is C2, turn on an outdoor unit ODU3 of the antenna A3, and detect that energy strength of the received signal is C3, and therefore, when the second signal processing apparatus is the antenna A2, an isolation of the antenna A2 relative to the antenna A1 is G1, where G1=C2−C1; and turn on a first signal source B3, turn off signal sources B1 and B2, turn on an outdoor unit ODU1 of the antenna A1, detect that energy strength of a received signal is C4, turn on an outdoor unit ODU2 of the antenna A2, detect that energy strength of the received signal is C5, turn on an outdoor unit ODU3 of the antenna A3, and detect that energy strength of the received signal is C6, and therefore, when the second signal processing apparatus is the antenna A3, an isolation of the antenna A3 relative to the antenna A1 is G2, where G2=C6−C4.

Regardless of the ratio of the energy strength of the signals sent by the first signal source and the second signal source, the isolation of the second signal processing apparatus relative to the first signal processing apparatus remains unchanged.

It should be noted that when the first signal processing apparatus is the antenna A2, a method of calculating the isolation of the antenna A1 relative to the antenna A2 and the isolation of the antenna A3 relative to the antenna A2 is the same as the calculation method used when the first signal processing apparatus is the antenna A1.

Further, the isolation of the second signal processing apparatus relative to the first signal processing apparatus is different from an isolation of the first signal processing apparatus relative to the second signal processing apparatus. A method of calculating the isolation of the first signal processing apparatus relative to the second signal processing apparatus is: assuming that only the first signal source B1 is turned on, turn off the signal sources B2 and B3, turn on the outdoor unit ODU1 of the antenna A1, detect that energy strength of the received signal is D2, turn on the outdoor unit ODU2 of the antenna A2, and detect that energy strength of the received signal is D1, and therefore, the isolation of the antenna A1 relative to the antenna A2 is G3, where G3=D2−D1. A reason why the isolation of the second signal processing apparatus relative to the first signal processing apparatus is different from the isolation of the first signal processing apparatus relative to the second signal processing apparatus is: the isolation of the second signal processing apparatus relative to the first signal processing apparatus reflects a difference between energy strength of a signal received by the second signal processing apparatus and energy strength of a signal received by the first signal processing apparatus when only the second signal source sends a signal, and the isolation of the first signal processing apparatus relative to the second signal processing apparatus reflects a difference between energy strength of a signal received by the first signal processing apparatus and energy strength of a signal received by the second signal processing apparatus when only the first signal source sends a signal. Because a deflection angle of the first signal processing apparatus is different from a deflection angle of the second signal processing apparatus, even if the energy strength of the signal sent by the first signal source is the same as the energy strength of the signal sent by the second signal source, that is, D2=C2, the energy strength C1 of the signal received by A1 is different from the energy strength D1 of the signal received by A2, and then, calculated isolations G1 and G3 are different.

S203: The first signal processing apparatus acquires energy strength of a desired reference signal corresponding to the second signal source, where the desired reference signal corresponding to the second signal source is a signal obtained after coding and modulation processing is performed on the desired signal sent by the second signal source.

In a specific embodiment, the desired reference signal corresponding to the second signal source may be the signal obtained after coding and modulation processing is performed on the desired signal sent by the second signal source, where a waveform of the signal obtained after the coding and modulation processing is the same as a waveform of the signal sent by the second signal source, and only modulation parameters of the signals are different. Specifically, a manner in which the first signal processing apparatus acquires the energy strength of the desired reference signal corresponding to the second signal source may be: acquiring the energy strength of the desired signal corresponding to the second signal source from the second signal processing apparatus, where the second signal processing apparatus is a processing apparatus that acquires, from the mixed signal received by the second signal processing apparatus, the desired signal sent by the second signal source, and performs coding and modulation processing on the desired signal sent by the second signal source. The second signal processing apparatus corresponds to the second signal source, for example, the antenna A2 or A3 in FIG. 2. The indoor unit IDU1 in A1 acquires the energy strength from the indoor unit IDU2 in the antenna A2 and the indoor unit IDU3 in A3.

S204: The first signal processing apparatus calculates, according to the energy strength of the mixed signal, the isolation, and the energy strength of the desired reference signal corresponding to the second signal source, energy strength of a signal sent by a first signal source and received by the first signal processing apparatus and energy strength of a signal sent by the second signal source and received by the first signal processing apparatus.

In a specific embodiment, the first signal processing apparatus further calculates, according to the acquired energy strength of the mixed signal, the energy strength of the desired reference signal corresponding to the second signal source, and the calculated isolation, the energy strength of the signal sent by the first signal source and received by the first signal processing apparatus and the energy strength of the signal sent by the second signal source and received by the first signal processing apparatus. A specific calculation method may be: still using FIG. 2 as an example for description herein, assuming that the energy strength of the mixed signal is P, the isolation of the antenna A2 relative to the antenna A1 is G1, the energy strength of the desired reference signal corresponding to the second signal source, that is, the desired reference signal corresponding to the antenna B2, is Q, the energy strength of the signal sent by the first signal source and received by the first signal processing apparatus is ab11, and the energy strength of the signal sent by the second signal source and received by the first signal processing apparatus is ab12, where the variables P, G1, and Q are known and the variables ab11 and ab12 are unknown, calculation is performed according to the parameters. Specific calculation steps are: calculating the variable ab12, where ab12=Q−G1, and because the isolation G1 remains unchanged, ab22−ab12 in the antenna A2 is identically equal to G1, where the energy strength of the desired reference signal corresponding to the second signal source is ab22; and then, subtracting, from the energy strength of the mixed signal, the energy strength ab12 of the signal sent by the second signal source and received by the first signal processing apparatus, to obtain the energy strength ab11 of the signal sent by the first signal source and received by the first signal processing apparatus, where ab11=P−ab12.

It should be noted that, when the second signal source is the antenna A3, the calculation method of the antenna A3 is the same as the calculation method of the antenna A2.

S205: The first signal processing apparatus calculates a ratio of the energy strength of the signal sent by the first signal source and received by the first signal processing apparatus to the energy strength of the signal sent by the second signal source and received by the first signal processing apparatus.

In a specific embodiment, the first signal processing apparatus further calculates, according to the calculated energy strength, the ratio of the energy strength of the signal sent by the first signal source and received by the first signal processing apparatus to the energy strength of the signal sent by the second signal source and received by the first signal processing apparatus. Assuming that the energy strength of the signal sent by the first signal source and received by the first signal processing apparatus is ab11 and the energy strength of the signal sent by the second signal source and received by the first signal processing apparatus is ab12, the ratio is ab11/ab12.

S206: If the energy strength ratio is less than a first preset threshold, the first signal processing apparatus acquires the desired reference signal corresponding to the second signal source.

In a specific embodiment, if the energy strength ratio is less than the first preset threshold, it indicates that the interference signal has relatively strong interference to the desired signal. The first preset threshold may be obtained by adding 10 dB to a threshold of a receiving signal to noise ratio of the first signal processing apparatus (the threshold may be obtained through querying according to a specific encoding mode in the communications system).

The interference signal may be the signal sent by the second signal source and received by the first signal processing apparatus, and the first signal processing apparatus may acquire, from a signal processing apparatus receiving the desired signal sent by the second signal source, the desired reference signal corresponding to the second signal source. It should be noted that, the desired reference signal corresponding to the second signal source may be the signal obtained after coding and modulation processing is performed on the desired signal sent by the second signal source, where a waveform of the signal obtained after the coding and modulation processing is the same as a waveform of the signal sent by the second signal source, and only modulation parameters of the signals are different.

S207: The first signal processing apparatus performs interference reconstruction on the desired reference signal corresponding to the second signal source, to obtain an interference signal sent by the second signal source.

In a specific embodiment, the first signal processing apparatus performs interference reconstruction on the acquired desired reference signal corresponding to the second signal source, to obtain the interference signal sent by the second signal source. Specifically, referring to FIG. 14, a process of performing interference reconstruction on the desired reference signal corresponding to the second signal source may be: first providing the desired reference signal corresponding to the second signal source to an interference channel estimator, such as a signal S1 and a signal S2 in the figure, separately controlling the signal S1 and the signal S2 to enter two interference channel estimators, and performing, by the interference channel estimator, interference channel estimation on a channel between the second signal source and the first signal processing apparatus, so as to re-establish the signal sent by the second signal source and received by the first signal processing apparatus, that is, the interference signal sent by the second signal source in the mixed signal. Then, a signal obtained after processing of the interference channel estimator enters a first phase noise suppressor, to perform phase deviation adjustment, so as to reduce phase noise and a phase shift in the signal obtained after the interference channel processing. It should be noted that, the interference channel estimator may be implemented by using multiple algorithms, for example, a least mean square (LMS) algorithm or a recursive least square (RLS) algorithm, and the phase noise suppressor may be implemented by using a phase tracking algorithm such as a phase locked loop (PLL) algorithm. After processing of the interference channel estimator and the first phase noise suppressor, the interference signal sent by the second signal source may be obtained.

S208: The first signal processing apparatus recognizes a signal that is the same as the interference signal sent by the second signal source and that is in the mixed signal as the signal sent by the second signal source, and uses the signal sent by the second signal source in the mixed signal as an interference signal and separates the interference signal.

Figure 14:
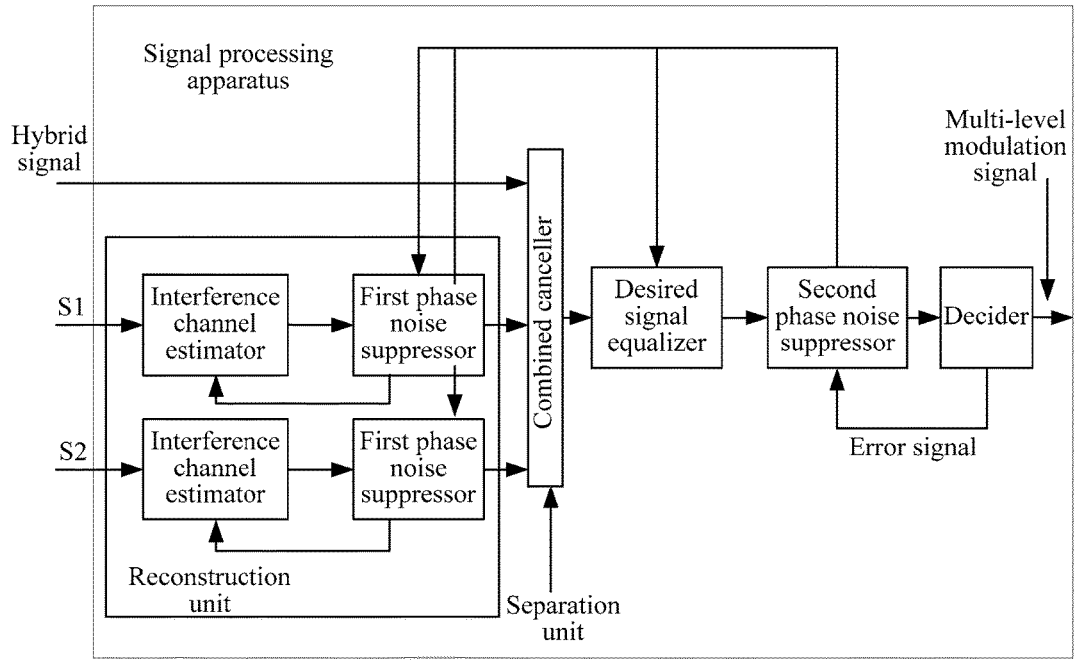
FIG. 14 is a schematic structural diagram of still another signal processing apparatus according to the present disclosure.

In a specific embodiment, the first signal processing apparatus recognizes, from the mixed signal, the signal the same as the interference signal obtained after interference reconstruction and sent by the second signal source, and a specific recognizing process may be: recognizing a signal having a signal parameter the same as a signal parameter of the interference signal from the mixed signal, where the signal parameter may include a signal amplitude and a signal phase. Then, it is determined that the recognized signal is the signal sent by the second signal source, the signal sent by the second signal source in the mixed signal is used as the interference signal, and the interference signal is separated. A specific recognizing and separation manner may be:

performing separation by using a combined canceller. As shown in FIG. 14, the combined canceller recognizes a signal having a signal parameter the same as the signal parameter of the interference signal from the mixed signal, and subtracts the signal from the mixed signal. A mixed signal from which the interference signal is separated is the desired signal that is sent by the first signal source and that the first signal processing apparatus needs to receive, that is, the signal output by the combined canceller in FIG. 14 is the desired signal sent by the first signal source.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Figure 6:
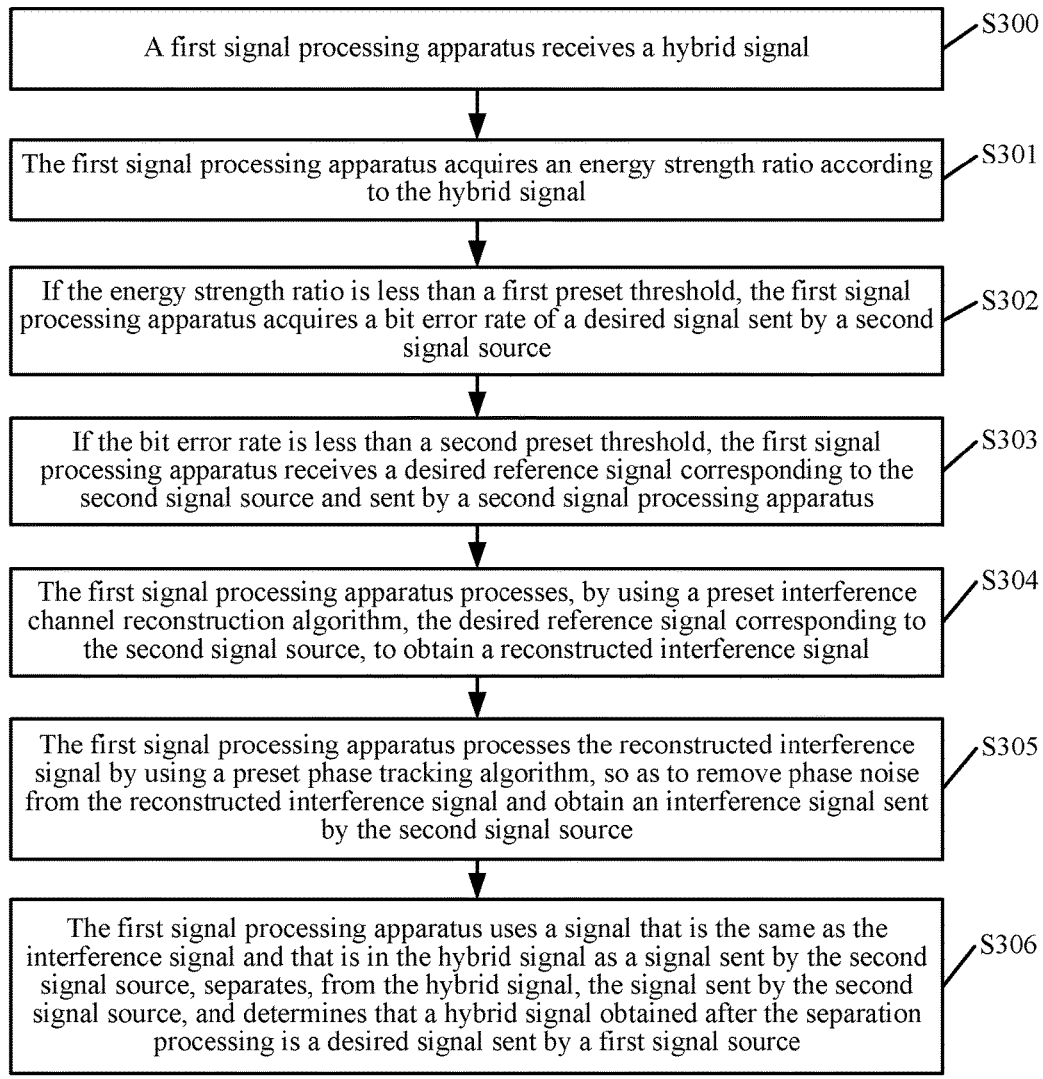
FIG. 6 is a schematic flowchart of still another signal processing method according to the present disclosure.

Refer to FIG. 6, which is a schematic flowchart of still another signal processing method according to an embodiment of the present disclosure. The method may include the following step S300 to step S306:

S300: A first signal processing apparatus receives a mixed signal.

In a specific embodiment, for step S300 in this embodiment of the present disclosure, reference may be made to step S100 shown in FIG. 1, and no further details are described herein again.

S301: The first signal processing apparatus acquires an energy strength ratio according to the mixed signal, where the energy strength ratio includes a ratio of energy strength of a signal sent by a first signal source and received by the first signal processing apparatus to energy strength of a signal sent by a second signal source and received by the first signal processing apparatus.

In a specific embodiment, for step S301 in this embodiment of the present disclosure, reference may be made to step S101 shown in FIG. 1, and no further details are described herein again.

S302: If the energy strength ratio is less than a first preset threshold, the first signal processing apparatus acquires a bit error rate of a desired signal sent by the second signal source.

In a specific embodiment, the first preset threshold may be obtained by adding 10 dB to a threshold of a receiving signal to noise ratio of the first signal processing apparatus, that is, it is considered that an interference signal having receiving noise less than 10 dB does not need to be canceled. When the energy strength ratio is less than the first preset threshold, it is considered that the interference signal sent by the second signal source has relatively strong interference to the desired signal, and the first signal processing apparatus acquires the bit error rate of the desired signal sent by the second signal source. The first signal processing apparatus may specifically acquire, from the second signal processing apparatus, the bit error rate of the desired signal sent by the second signal source. The second signal processing apparatus stores a desired reference signal corresponding to the second signal source and used for interference reconstruction and the bit error rate of the desired signal sent by the second signal source. To check whether the desired reference signal corresponding to the second signal source and stored in the second signal processing apparatus is available, the first signal processing apparatus acquires, from the second signal processing apparatus, the bit error rate of the desired signal sent by the second signal source. If the bit error rate of the desired signal sent by the second signal source is relatively large, it indicates that the desired reference signal corresponding to the second signal source in the second signal processing apparatus is unavailable; if the bit error rate of the desired signal sent by the second signal source is relatively small, it indicates that the desired reference signal corresponding to the second signal source in the second signal processing apparatus is available.

S303: If the bit error rate is less than a second preset threshold, the first signal processing apparatus receives a desired reference signal corresponding to the second signal source and sent by a second signal processing apparatus.

In a specific embodiment, when the bit error rate, stored in the second signal processing apparatus, of the desired signal sent by the second signal source is less than the second preset threshold, it indicates that the desired reference signal corresponding to the second signal source and stored in the second signal processing apparatus is available, and the first signal processing apparatus receives the desired reference signal corresponding to the second signal source and sent by the second signal processing apparatus. It should be noted that, the second signal processing apparatus may be an antenna apparatus, and the second signal processing apparatus mainly receives the desired signal sent by the second signal source, but may also simultaneously receive an interference signal sent by the first signal source. The second signal processing apparatus stores the desired reference signal corresponding to the second signal source and the bit error rate of the desired signal sent by the second signal source.

S304: The first signal processing apparatus processes, by using a preset interference channel reconstruction algorithm, the desired reference signal corresponding to the second signal source, to obtain a reconstructed interference signal.

In a specific embodiment, the first signal processing apparatus may input the desired reference signal corresponding to the second signal source to an interference channel estimator, where the interference channel estimator performs interference reconstruction on the desired reference signal by using the preset interference channel reconstruction algorithm, to obtain the reconstructed interference signal. It should be noted that the preset interference channel reconstruction algorithm may be a least mean square algorithm LMS or a recursive least square algorithm RLS. The interference channel estimator inputs the processed signal to a phase noise suppressor.

S305: The first signal processing apparatus processes the reconstructed interference signal by using a preset phase tracking algorithm, so as to remove phase noise from the reconstructed interference signal and obtain an interference signal sent by the second signal source.

In a specific embodiment, the phase noise suppressor in the first signal processing apparatus processes the reconstructed interference signal by using a phase tracking algorithm, for example, a phase locked loop algorithm PLL, to remove phase noise from the reconstructed interference signal, that is, adjust a phase deviation in the reconstructed interference signal, so as to obtain the interference signal sent by the second signal source.

S306: The first signal processing apparatus recognizes a signal that is the same as the interference signal sent by the second signal source and that is in the mixed signal as the signal sent by the second signal source, and uses the signal sent by the second signal source in the mixed signal as an interference signal and separates the interference signal.

Figure 3:
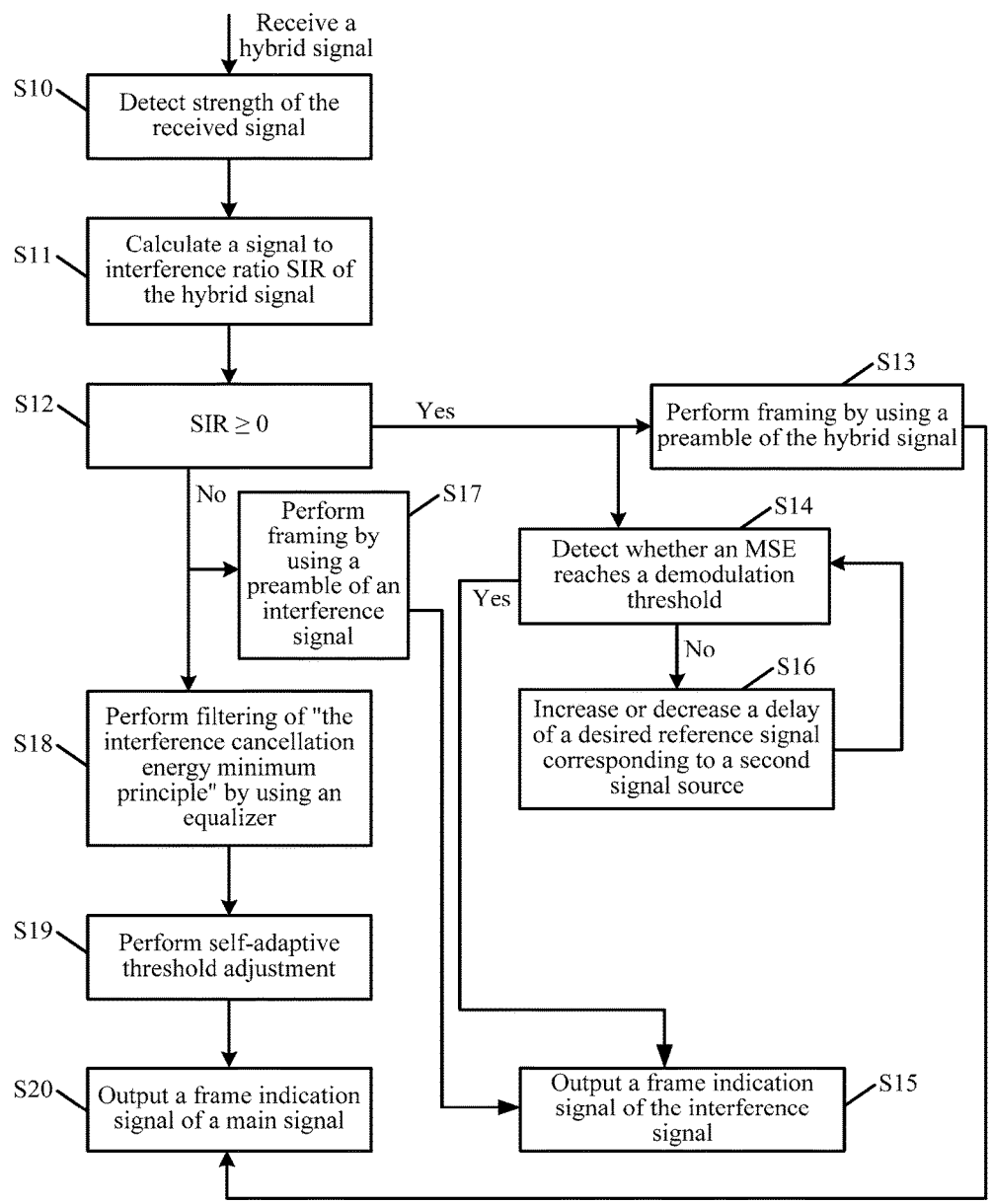
FIG. 3 is a flowchart of a synchronization method according to an embodiment of the present disclosure.

In a specific embodiment, for step S306 in this embodiment of the present disclosure, reference may be made to step S208 shown in FIG. 3, and no further details are described herein again.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Figure 7:
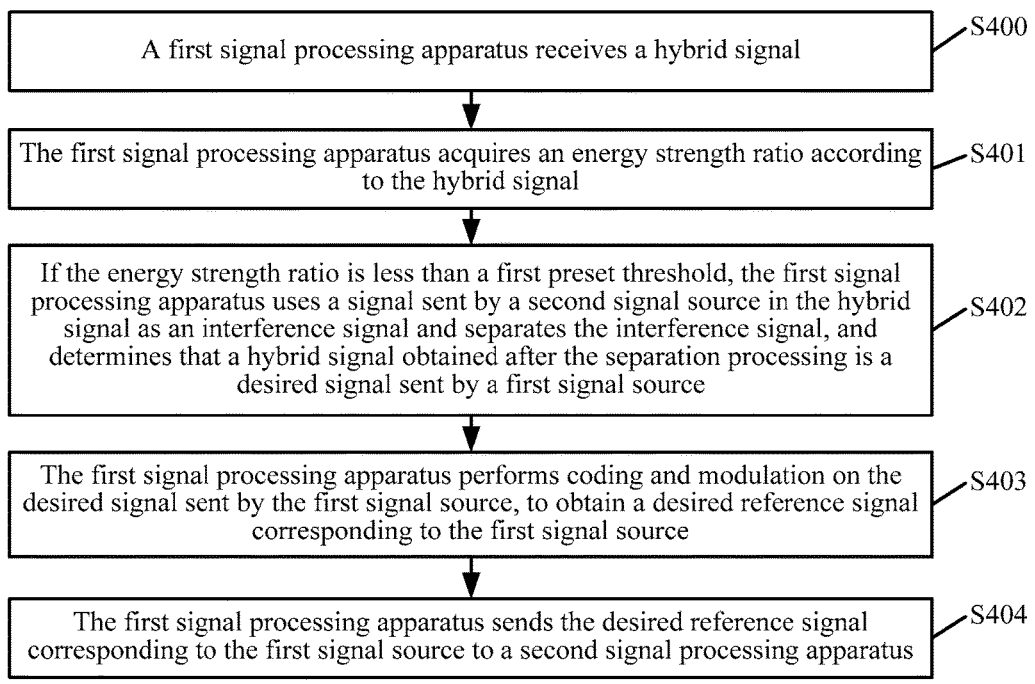
FIG. 7 is a schematic flowchart of still another signal processing method according to the present disclosure.

Refer to FIG. 7, which is a schematic flowchart of still another signal processing method according to an embodiment of the present disclosure. The method may include the following step S400 to step S404:

S400: A first signal processing apparatus receives a mixed signal.

In a specific embodiment, for step S400 in this embodiment of the present disclosure, refer to step S100 in the embodiment described in FIG. 1, and no further details are described herein again.

S401: The first signal processing apparatus acquires an energy strength ratio according to the mixed signal, where the energy strength ratio includes a ratio of energy strength of a signal sent by a first signal source and received by the first signal processing apparatus to energy strength of a signal sent by a second signal source and received by the first signal processing apparatus.

In a specific embodiment, for step S401 in this embodiment of the present disclosure, refer to step S101 in the embodiment described in FIG. 1, and no further details are described herein again.

S402: If the energy strength ratio is less than a first preset threshold, the first signal processing apparatus uses the signal sent by the second signal source in the mixed signal as an interference signal and separates the interference signal, and determines that a mixed signal obtained after the separation processing is the desired signal sent by the first signal source.

In a specific embodiment, for step S402 in this embodiment of the present disclosure, refer to step S102 in the embodiment described in FIG. 1, and no further details are described herein again.

S403: The first signal processing apparatus performs coding and modulation on the desired signal sent by the first signal source, to obtain a desired reference signal corresponding to the first signal source.

In a specific embodiment, the first signal processing apparatus performs demodulation and decoding on the desired signal obtained after the separation processing and sent by the first signal source, and then performs coding and modulation again, to obtain the desired reference signal corresponding to the first signal source, where the desired reference signal is used to perform interference reconstruction when the first signal source is an interference signal source, to re-establish an interference signal sent by the first signal source. Further, the first signal processing apparatus may calculate a bit error rate of the desired signal sent by the first signal source, where the bit error rate may be used to determine whether the desired reference signal corresponding to the first signal source is available.

S404: The first signal processing apparatus sends the desired reference signal corresponding to the first signal source to a second signal processing apparatus, so that the second signal processing apparatus performs interference reconstruction on the desired reference signal corresponding to the first signal source, to obtain an interference signal sent by the first signal source, and the second signal processing apparatus separates, from a mixed signal received by the second signal processing apparatus, a signal the same as the interference signal sent by the first signal source.

In a specific embodiment, the first signal processing apparatus sends, to the second signal processing apparatus, the obtained desired reference signal corresponding to the first signal source and the obtained bit error rate of the desired signal sent by the first signal source, where the second signal processing apparatus may be all signal processing apparatuses except the first signal processing apparatus. The desired reference signal corresponding to the first signal source and the bit error rate of the desired signal sent by the first signal source may be used by the second signal processing apparatus to construct the interference signal sent by the first signal source. The second signal processing apparatus separates, from the received mixed signal, a signal the same as the reconstructed interference signal sent by the first signal source, to obtain a desired signal sent by the second signal source.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Figure 8:
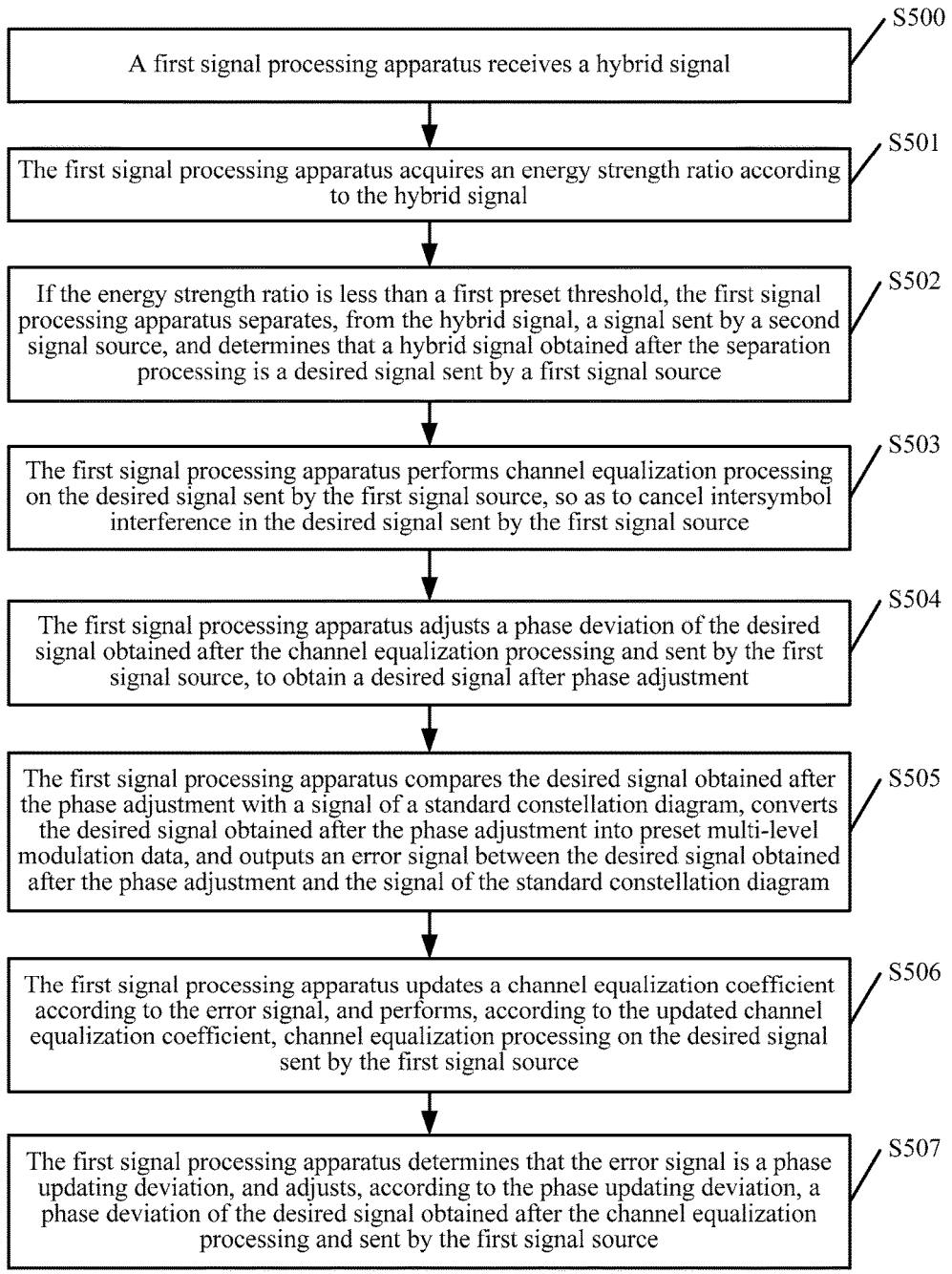
FIG. 8 is a schematic flowchart of still another signal processing method according to the present disclosure.

Refer to FIG. 8, which is a schematic flowchart of still another signal processing method according to an embodiment of the present disclosure. As shown in the figure, the method includes the following step S500 to step S507:

S500: A first signal processing apparatus receives a mixed signal.

In a specific embodiment, for step S500 in this embodiment of the present disclosure, refer to step S100 in the embodiment described in FIG. 1, and no further details are described herein again.

S501: The first signal processing apparatus acquires an energy strength ratio according to the mixed signal, where the energy strength ratio includes a ratio of energy strength of a signal sent by a first signal source and received by the first signal processing apparatus to energy strength of a signal sent by a second signal source and received by the first signal processing apparatus.

In a specific embodiment, for step S501 in this embodiment of the present disclosure, refer to step S101 in the embodiment described in FIG. 1, and no further details are described herein again.

S502: If the energy strength ratio is less than a first preset threshold, the first signal processing apparatus uses the signal sent by the second signal source in the mixed signal as an interference signal and separates the interference signal, and determines that a mixed signal obtained after the separation processing is the desired signal sent by the first signal source.

In a specific embodiment, for step S502 in this embodiment of the present disclosure, refer to step S102 in the embodiment described in FIG. 1, and no further details are described herein again.

S503: The first signal processing apparatus performs channel equalization processing on the desired signal sent by the first signal source, so as to cancel intersymbol interference in the desired signal sent by the first signal source.

In a specific embodiment, a specific processing method used by the first signal processing apparatus to perform channel equalization processing on the desired signal sent by the first signal source may be: processing, by using a desired signal equalizer, the desired signal sent by the first signal source. As shown in FIG. 14, a desired signal equalizer performs, by using a channel equalization coefficient, channel equalization processing on the desired signal sent by the first signal source, so that intersymbol interference in the desired signal sent by the first signal source may be canceled after the channel equalization processing.

S504: The first signal processing apparatus adjusts a phase deviation of the desired signal obtained after the channel equalization processing and sent by the first signal source, to obtain a desired signal after phase adjustment.

In a specific embodiment, the desired signal obtained after the channel equalization processing and sent by the first signal source may also enter a phase noise suppressor to adjust the phase deviation, so as to reduce phase noise in the signal. As shown in FIG. 14, a signal obtained after the desired signal equalizer performs channel equalization processing enters a second phase noise suppressor, to adjust the phase deviation of the signal and obtain the desired signal after the phase adjustment. It should be noted that there is a phase drift in a signal transmission process; therefore, the phase deviation needs to be adjusted.

S505: The first signal processing apparatus compares the desired signal obtained after the phase adjustment with a signal of a standard constellation diagram, converts the desired signal obtained after the phase adjustment into preset multi-level modulation data, and outputs an error signal between the desired signal obtained after the phase adjustment and the signal of the standard constellation diagram.

In a specific embodiment, decision processing may be performed on the desired signal obtained after the phase adjustment, to obtain a preset multi-level modulation signal. A specific processing process may be: inputting the desired signal obtained after the phase adjustment to a decider to perform decision, so that the decider compares the desired signal sent by the second signal source with the signal of the standard constellation diagram. A specific comparison manner may be: performing sampling on the desired signal to obtain multiple sampling points, comparing an amplitude and a phase of each sampling point with those of each constellation point on the standard constellation diagram, selecting a multi-level modulation symbol corresponding to a constellation point nearest to the constellation point on the standard constellation diagram, and determining that the multi-level modulation symbol is a multi-level modulation symbol of the sampling point. Because the amplitude and phase of the sampling point of the desired signal do not completely overlap with those of the constellation point on the standard constellation diagram, there may be an error signal, and the error signal is acquired.

S506: The first signal processing apparatus updates a channel equalization coefficient according to the error signal, and performs, according to the updated channel equalization coefficient, channel equalization processing on the desired signal sent by the first signal source, to reduce an error between the desired signal obtained after the phase adjustment and the signal of the standard constellation diagram.

In a specific embodiment, the first signal processing apparatus configures and updates the coefficient according to the error signal, so as to reduce the error between the desired signal obtained after the phase adjustment and the signal of the standard constellation diagram, so that the desired signal overlaps with the constellation point on the standard constellation diagram as much as possible. Specifically, as shown in FIG. 14, the error signal enters the desired signal equalizer by means of an unwinding operation and is used as an input for coefficient updating, so as to update the channel equalization coefficient in the desired signal equalizer. Then, the desired signal equalizer performs, according to the updated channel equalization coefficient, channel equalization processing on the desired signal sent by the first signal source, so as to reduce a decision error. It should be noted that, this process is performing continuous iteration until the error is the smallest.

S507: The first signal processing apparatus determines that the error signal is a phase update deviation, and adjusts, according to the phase update deviation, a phase deviation of the desired signal obtained after the channel equalization processing and sent by the first signal source, so as to reduce the error between the desired signal obtained after the phase adjustment and the signal of the standard constellation diagram.

In a specific embodiment, the first signal processing apparatus determines that the error signal is a phase update error, where the phase update error indicates that there is a phase deviation between the desired signal obtained after the phase adjustment and the signal of the standard constellation diagram; therefore, the first signal processing apparatus may use the phase update deviation as a reference, and adjust, according to the phase update deviation, the phase deviation of the desired signal obtained after the channel equalization processing and sent by the first signal source, so that the decision error is smaller. It should be noted that this process is performing continuous iteration until the error is the smallest.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Figure 9:
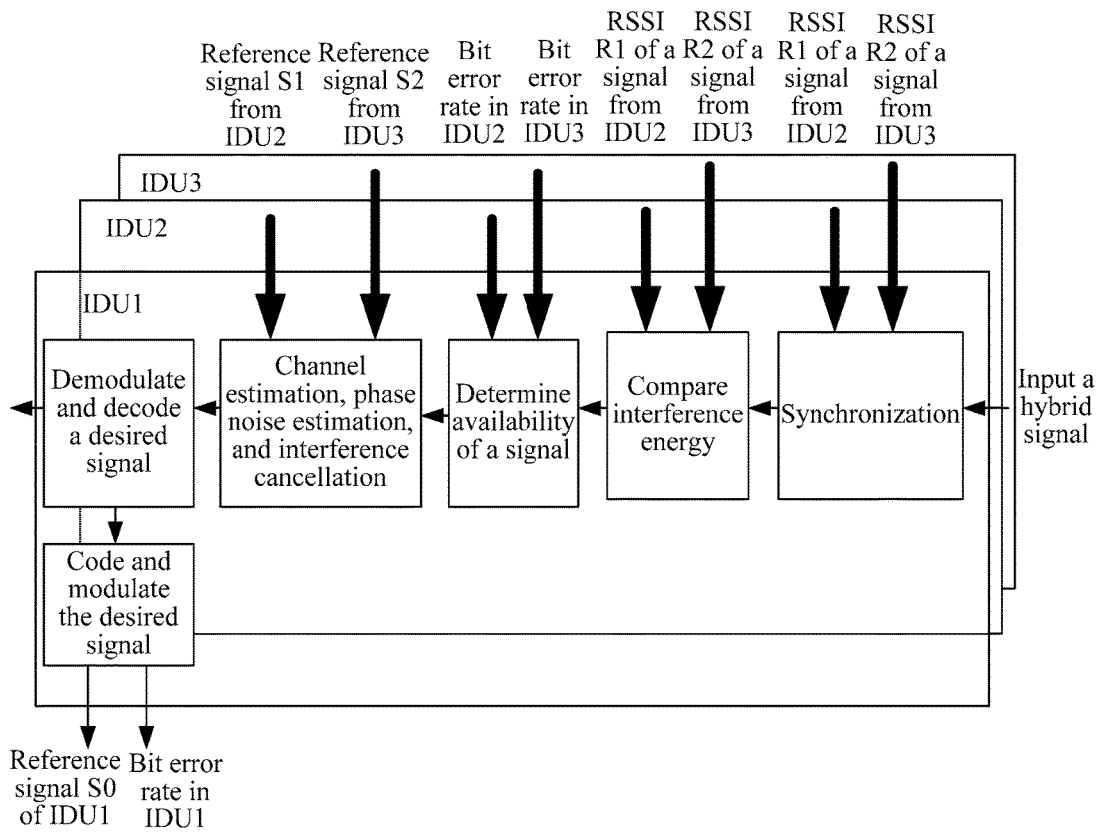
FIG. 9 is a block diagram of a process of a signal processing method according to the present disclosure.

Referring to FIG. 9, FIG. 9 is a block diagram of a signal processing process according to an embodiment of the present disclosure, and also referring to FIG. 2, as shown in the figure, assuming that a first signal processing apparatus is an antenna apparatus, that is, A1 in FIG. 2, an ODU1 in the first signal processing apparatus A1 receives a mixed signal, and outputs the mixed signal to an IDU1, so that the IDU1 processes the mixed signal. The IDU1 acquires, from an IDU2 in an antenna apparatus A2 and an IDU3 in an antenna apparatus A3, energy strength (RSSI) of a desired reference signal corresponding to a signal source B2 and energy strength (RSSI) of a desired reference signal corresponding to a signal source B3. Assuming that the energy strength RSSI of the desired reference signal corresponding to the signal source B2 is R1 and the energy strength RSSI of the desired reference signal corresponding to the signal source B3 is R2, a signal to interference ratio SIR of the mixed signal is calculated, and different synchronization processing is performed according to a result of comparing the signal to interference ratio SIR with 0. For a specific processing process, refer to step S101 in FIG. 1. Interference energy comparison is performed on synchronized signals, that is, separately, energy strength of a signal sent by the signal source B1 and received by the antenna A1 in the mixed signal is compared with energy strength of a signal sent by the signal source B2 and received by the antenna A1, and the energy strength of the signal sent by the signal source B1 and received by the antenna A1 is compared with energy strength of a signal sent by a signal source B3 and received by the antenna A1. For a specific comparison method, refer to the descriptions in FIG. 3, where the signal source B2 or the signal source B3 is a second signal source. When the energy strength of the signal sent by the second signal source in the mixed signal is relatively large, that is, an interference signal is relatively strong, bit error rates of desired reference signals corresponding to the signal source B2 and the signal source B3 are acquired from the IDU2 in the antenna apparatus A2 and the IDU3 in the antenna apparatus A3, to determine availability of the desired reference signals stored in the antenna apparatus A2 and the antenna apparatus A3. For specific determining steps, refer to the descriptions in FIG. 4. If the desired reference signals in the antenna apparatus A2 and the antenna apparatus A3 are available, the desired reference signals S1 and S2 are acquired from the IDU2 in the antenna apparatus A2 and the IDU3 in the antenna apparatus A3, and then interference reconstruction is performed on the desired reference signals. Specific reconstruction steps include channel estimation, phase noise estimation, and interference cancellation. Finally, demodulation and decoding are performed, to obtain and output a desired signal sent by the signal source B1. If coding and modulation is performed on the desired signal then, a desired reference signal corresponding to the signal source B1 may be obtained, and the desired reference signal is sent to the IDU2 in the antenna apparatus A2 and the IDU3 in the antenna apparatus A3, so that the antenna apparatus A2 and the antenna apparatus A3 re-establish an interference signal sent by the signal source B1.

A structure of a signal processing apparatus provided in the embodiments of the present disclosure is described below in detail with reference to FIG. 10 to FIG. 15. It should be noted that the following signal processing apparatus may be applied to the foregoing method.

Figure 10:
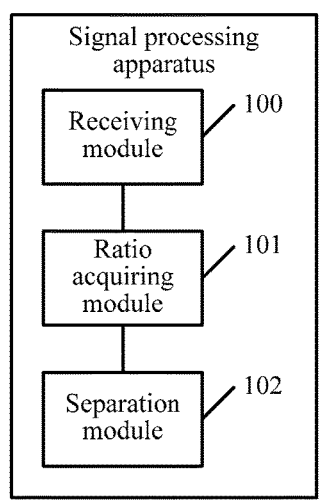
FIG. 10 is a schematic structural diagram of a signal processing apparatus according to the present disclosure.

Refer to FIG. 10, which is a schematic structural diagram of a signal processing apparatus according to an embodiment of the present disclosure. The signal processing apparatus may include a receiving module 100, a ratio acquiring module 101, and a separation module 102.

The receiving module 100 is configured to receive a mixed signal.

In a specific embodiment, a first signal processing apparatus may be an antenna apparatus, and the antenna apparatus may include an indoor unit IDU and an outdoor unit ODU, where the outdoor unit ODU in the antenna apparatus receives the mixed signal, and the indoor unit IDU processes the received mixed signal. The receiving module 100 receives the mixed signal. It should be noted that the mixed signal may include a desired signal that is sent by a first signal source and that the first signal processing apparatus needs to receive, and may also include an interference signal sent by a second signal source and received by the first signal processing apparatus, and further, may also include a noise signal. The second signal source may be all signal sources except the first signal source.

The ratio acquiring module 101 is configured to acquire an energy strength ratio according to the mixed signal, where the energy strength ratio includes a ratio of energy strength of a signal sent by the first signal source and received by the signal processing apparatus to energy strength of a signal sent by the second signal source and received by the signal processing apparatus.

In a specific embodiment, the ratio acquiring module 101 in the first signal processing apparatus further processes the received mixed signal, to obtain the ratio of the energy strength of the signal sent by the first signal source and received by the first signal processing apparatus to the energy strength of the signal sent by the second signal source and received by the first signal processing apparatus in the mixed signal. A specific manner of acquiring the energy strength ratio may be: the ratio acquiring module 101 obtains the ratio through calculation according to energy strength of the mixed signal and an isolation between the first signal processing apparatus and a second signal processing apparatus. The signal sent by the first signal source may be the desired signal that the first signal processing apparatus needs to receive, the signal sent by the second signal source may be an interference signal received by the first signal processing apparatus, and a degree of impact of the interference signal on the desired signal may be acquired according to the ratio of the energy strength of the desired signal to the energy strength of the interference signal. When the interference signal has a relatively high degree of impact on the desired signal, the energy strength ratio is relatively small; when the interference signal has a relatively low degree of impact on the desired signal, the energy strength ratio is relatively large.

Further, after the mixed signal is received and before the energy strength ratio is acquired according to the mixed signal, the ratio acquiring module 101 in the first signal processing apparatus may further perform synchronization processing on all signals included in the mixed signal. It should be noted that the synchronization processing is merely an optional implementation step, to reduce an error when combined cancellation is performed on the mixed signal and a reconstructed interference signal.

The separation module 102 is configured to: if the energy strength ratio is less than a first preset threshold, use the signal sent by the second signal source in the mixed signal as an interference signal and separate the interference signal, and determine that a mixed signal obtained after the separation processing is the desired signal sent by the first signal source.

In a specific embodiment, the first preset threshold is determined by a user according to an actual case, and the first preset threshold may be a threshold of a receiving signal to noise ratio of the first signal processing apparatus (the threshold may be obtained through querying according to a specific encoding mode in the communications system). The signal sent by the second signal source is the interference signal received by the first signal processing apparatus. The ratio of the energy strength of the desired signal to the energy strength of the interference signal reflects a degree of impact of the interference signal on the desired signal. When the energy strength is less than the first preset threshold, it indicates that the interference signal has a relatively high degree of impact on the desired signal; therefore, the separation module 102 in the first signal processing apparatus uses the signal sent by the second signal source in the mixed signal as the interference signal and separates the interference signal. A specific separation process may be: acquiring a desired reference signal corresponding to the second signal source from the second signal processing apparatus, performing interference reconstruction on the desired signal corresponding to the second signal source, and recovering the interference signal sent by the second signal source and received by the first signal processing apparatus, where a signal obtained after the separation module 102 separates, from the mixed signal, the interference signal sent by the second signal source is the desired signal sent by the first signal source. It should be noted that the second signal processing apparatus stores the desired reference signal corresponding to the second signal source.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Figure 11:
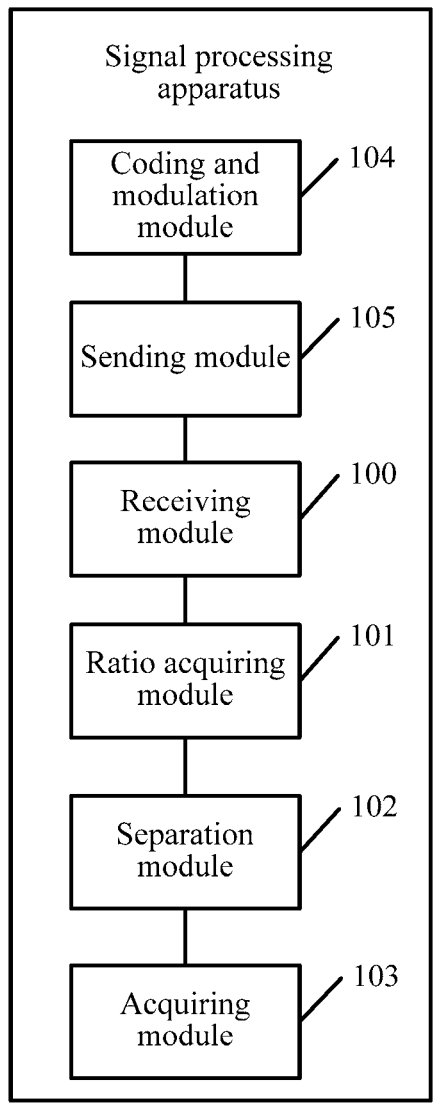
FIG. 11 is a schematic structural diagram of another signal processing apparatus according to the present disclosure.

Refer to FIG. 11, which is a schematic structural diagram of another signal processing apparatus according to an embodiment of the present disclosure. The signal processing apparatus may include a receiving module 100, a ratio acquiring module 101, a separation module 102, an acquiring module 103, a coding and modulation module 104, and a sending module 105. For the receiving module 100, the ratio acquiring module 101, and the separation module 102, refer to FIG. 5, and no further details are described herein again.

The acquiring unit 103 is configured to: if the energy strength ratio is less than the first preset threshold, acquire a bit error rate of the desired signal sent by the second signal source.

In a specific embodiment, the first preset threshold may be obtained by adding 10 dB to a threshold of a receiving signal to noise ratio of the first signal processing apparatus, that is, it is considered that an interference signal having receiving noise less than 10 dB does not need to be canceled. When the energy strength ratio is less than the first preset threshold, it is considered that the interference signal sent by the second signal source has relatively strong interference to the desired signal, and the acquiring module 103 in the first signal processing apparatus acquires the bit error rate of the desired signal sent by the second signal source. The acquiring module 103 in the first signal processing apparatus may specifically acquire, from the second signal processing apparatus, the bit error rate of the desired signal sent by the second signal source. The second signal processing apparatus stores the desired reference signal corresponding to the second signal source and used for interference reconstruction and the bit error rate of the desired signal sent by the second signal source. To check whether the desired reference signal corresponding to the second signal source and stored in the second signal processing apparatus is available, the acquiring module 103 acquires, from the second signal processing apparatus, the bit error rate of the desired signal sent by the second signal source. If the bit error rate of the desired signal sent by the second signal source is relatively large, it indicates that the desired reference signal corresponding to the second signal source in the second signal processing apparatus is unavailable; if the bit error rate of the desired signal sent by the second signal source is relatively small, it indicates that the desired reference signal corresponding to the second signal source in the second signal processing apparatus is available.

The coding and modulation module 104 is configured to perform coding and modulation on the desired signal sent by the first signal source, to obtain a desired reference signal corresponding to the first signal source.

In a specific embodiment, the coding and modulation module 104 in the first signal processing apparatus performs demodulation and decoding on the desired signal obtained after the separation processing and sent by the first signal source, and then performs coding and modulation again, to obtain the desired reference signal corresponding to the first signal source, where the desired reference signal is used to perform interference reconstruction when the first signal source is an interference signal source, to re-establish an interference signal sent by the first signal source. Further, the coding and modulation module 104 in the first signal processing apparatus may calculate a bit error rate of the desired signal sent by the first signal source, where the bit error rate may be used to determine whether the desired reference signal corresponding to the first signal source is available.

The sending module 105 is configured to send the desired reference signal corresponding to the first signal source to a target signal processing apparatus, so that the target signal processing apparatus performs interference reconstruction on the desired reference signal corresponding to the first signal source, to obtain the interference signal sent by the first signal source, and the target signal processing apparatus separates, from a mixed signal received by the target signal processing apparatus, a signal the same as the interference signal sent by the first signal source.

In a specific embodiment, the sending module 105 in the first signal processing apparatus sends, to the second signal processing apparatus, the obtained desired reference signal corresponding to the first signal source and the obtained bit error rate of the desired signal sent by the first signal source, where the second signal processing apparatus may be all signal processing apparatuses except the first signal processing apparatus. The desired reference signal corresponding to the first signal source and the bit error rate of the desired signal sent by the first signal source may be used by the second signal processing apparatus to construct the interference signal sent by the first signal source. The second signal processing apparatus separates, from a received mixed signal, a signal the same as the reconstructed interference signal sent by the first signal source, to obtain the desired signal sent by the second signal source.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Structures of modules in the signal processing apparatus in this implementation manner are described below in detail with reference to FIG. 12 and FIG. 13.

Figure 12:
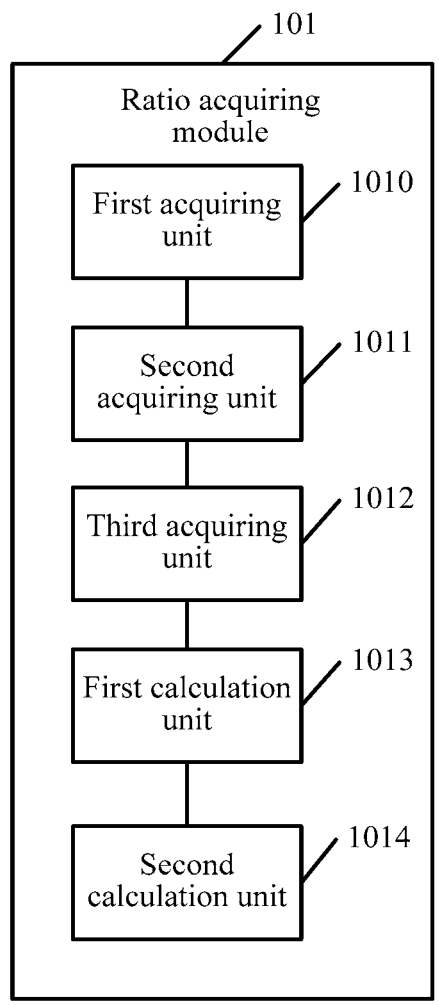
FIG. 12 is a schematic structural diagram of a ratio acquiring module according to the present disclosure.

Refer to FIG. 12, which is a schematic structural diagram of the ratio acquiring module in the signal processing apparatus provided in this embodiment of the present disclosure. The ratio acquiring module 101 may include a first acquiring unit 1010, a second acquiring unit 1011, a first calculation unit 1012, and a second calculation unit 1013.

The first acquiring unit 1010 is configured to acquire energy strength of the mixed signal.

In a specific embodiment, the first signal processing apparatus may be an antenna apparatus, and the first acquiring unit 1010 in the first signal processing apparatus measures energy strength of the received mixed signal, where the energy strength of the mixed signal may be power of the mixed signal, or may be energy of the mixed signal.

The second acquiring unit 1011 is configured to acquire an isolation of the target signal processing apparatus relative to the first signal processing apparatus, where the target signal processing apparatus is a processing apparatus that acquires the desired signal sent by the second signal source.

In a specific embodiment, the target signal processing apparatus and the first signal processing apparatus may be antenna apparatuses, and the target signal processing apparatus is a processing apparatus that acquires, from the mixed signal received by the target signal processing apparatus, the desired signal sent by the second signal source, and corresponds to the second signal source, for example, an antenna A2 or A3 in FIG. 2. The isolation of the target signal processing apparatus relative to the first signal processing apparatus reflects angles between different antenna apparatuses. A manner of acquiring the isolation of the target signal processing apparatus relative to the first signal processing apparatus may be: still using FIG. 2 as an example for description herein, turn on a first signal source B2, turn off signal sources B1 and B3, turn on an outdoor unit ODU1 of the antenna A1, the second acquiring unit 1011 detects that energy strength of a received signal is C1, turn on an outdoor unit ODU2 of the antenna A2, the second acquiring unit 1011 detects that energy strength of the received signal is C2, turn on an outdoor unit ODU3 of the antenna A3, and the second acquiring unit 1011 detects that energy strength of the received signal is C3, and therefore, when the second signal processing apparatus is the antenna A2, an isolation of the antenna A2 relative to the antenna A1 is G1, where G1=C2−C1; and turn on a first signal source B3, turn off signal sources B1 and B2, turn on an outdoor unit ODU1 of the antenna A1, the second acquiring unit 1011 detects that energy strength of a received signal is C4, turn on an outdoor unit ODU2 of the antenna A2, the second acquiring unit 1011 detects that energy strength of the received signal is C5, turn on an outdoor unit ODU3 of the antenna A3, and the second acquiring unit 1011 detects that energy strength of the received signal is C6, and therefore, when the second signal processing apparatus is the antenna A3, an isolation of the antenna A3 relative to the antenna A1 is G2, where G2=C6−C4.

Regardless of the ratio of the energy strength of the signals sent by the first signal source and the second signal source, the isolation of the target signal processing apparatus relative to the first signal processing apparatus remains unchanged.

It should be noted that when the first signal processing apparatus is the antenna A2, a method of calculating the isolation of the antenna A1 relative to the antenna A2 and the isolation of the antenna A3 relative to the antenna A2 is the same as the calculation method used when the first signal processing apparatus is the antenna A1.

Further, the isolation of the target signal processing apparatus relative to the first signal processing apparatus is different from the isolation of the first signal processing apparatus relative to the target signal processing apparatus. A method of calculating the isolation of the first signal processing apparatus relative to the target signal processing apparatus is: assuming that only the first signal source B1 is turned on, turn off the signal sources B2 and B3, turn on the outdoor unit ODU1 of the antenna A1, detect that energy strength of the received signal is D2, turn on the outdoor unit ODU2 of the antenna A2, and detect that energy strength of the received signal is D1, and therefore, the isolation of the antenna A1 relative to the antenna A2 is G3, where G3=D2−D1. A reason why the isolation of the target signal processing apparatus relative to the first signal processing apparatus is different from the isolation of the first signal processing apparatus relative to the target signal processing apparatus is: the isolation of the target signal processing apparatus relative to the first signal processing apparatus reflects a difference between the energy strength of the signal received by the target signal processing apparatus and the energy strength of the signal received by the first signal processing apparatus when only the second signal source sends a signal, and the isolation of the first signal processing apparatus relative to the target signal processing apparatus reflects a difference between the energy strength of the signal received by the first signal processing apparatus and the energy strength of the signal received by the target signal processing apparatus when only the first signal source sends a signal. Because a deflection angle of the first signal processing apparatus is different from a deflection angle of the target signal processing apparatus, even if the energy strength of the signal sent by the first signal source is the same as the energy strength of the signal sent by the second signal source, that is, D2=C2, the energy strength C1 of the signal received by A1 is different from the energy strength D1 of the signal received by A2, and then, calculated isolations G1 and G3 are different.

The third acquiring unit 1012 is configured to acquire energy strength of the desired reference signal corresponding to the second signal source, where the desired reference signal corresponding to the second signal source is a signal obtained after coding and modulation processing is performed on the desired signal sent by the second signal source.

In a specific embodiment, the desired reference signal corresponding to the second signal source may be the signal obtained after coding and modulation processing is performed on the desired signal sent by the second signal source, where a waveform of the signal obtained after the coding and modulation processing is the same as a waveform of the signal sent by the second signal source, and only modulation parameters of the signals are different. Specifically, a manner in which the third acquiring unit 1012 acquires the energy strength of the desired reference signal corresponding to the second signal source may be: the third acquiring unit 1012 acquires the energy strength of the desired signal corresponding to the second signal source from the target signal processing apparatus, where the target signal processing apparatus is a processing apparatus that acquires, from the mixed signal received by the target signal processing apparatus, the desired signal sent by the second signal source, and performs coding and modulation processing on the desired signal sent by the second signal source. The target signal processing apparatus corresponds to the second signal source.

The first calculation unit 1013 is configured to calculate, according to the energy strength of the mixed signal, the isolation, and the energy strength of the desired reference signal corresponding to the second signal source, the energy strength of the signal sent by the first signal source and received by the first signal processing apparatus and the energy strength of the signal sent by the second signal source and received by the first signal processing apparatus.

In a specific embodiment, the first calculation unit 1012 in the first signal processing apparatus further calculates, according to the acquired energy strength of the mixed signal, the energy strength of the desired reference signal corresponding to the second signal source, and the calculated isolation, the energy strength of the signal sent by the first signal source and received by the first signal processing apparatus and the energy strength of the signal sent by the second signal source and received by the first signal processing apparatus. A specific calculation method may be: still using FIG. 2 as an example for description herein, assuming that the energy strength of the mixed signal is P, the isolation of the antenna A2 relative to the antenna A1 is G1, the energy strength of the desired reference signal corresponding to the second signal source, that is, the desired reference signal corresponding to the antenna B2, is Q, the energy strength of the signal sent by the first signal source and received by the first signal processing apparatus is ab11, and the energy strength of the signal sent by the second signal source and received by the first signal processing apparatus is ab12, where the variables P, G1, and Q are known and the variables ab11 and ab12 are unknown, calculation is performed according to the parameters. Specific calculation steps are: calculating the variable ab12, where ab12=Q−G1, and because the isolation G1 remains unchanged, ab22−ab12 in the antenna A2 is identically equal to G1, where the energy strength of the desired reference signal corresponding to the second signal source is ab22; and then, subtracting, from the energy strength of the mixed signal, the energy strength ab12 of the signal sent by the second signal source and received by the first signal processing apparatus, to obtain the energy strength ab11 of the signal sent by the first signal source and received by the first signal processing apparatus, where ab11=P−ab12.

It should be noted that, when the second signal source is the antenna A3, the calculation method of the antenna A3 is the same as the calculation method of the antenna A2.

The second calculation unit 1014 is configured to calculate the ratio of the energy strength of the signal sent by the first signal source and received by the first signal processing apparatus to the energy strength of the signal sent by the second signal source and received by the first signal processing apparatus.

In a specific embodiment, the second calculation unit 1013 in the first signal processing apparatus further calculates, according to the calculated energy strength, the ratio of the energy strength of the signal sent by the first signal source and received by the first signal processing apparatus to the energy strength of the signal sent by the second signal source and received by the first signal processing apparatus. Assuming that the energy strength of the signal sent by the first signal source and received by the first signal processing apparatus is ab11 and the energy strength of the signal sent by the second signal source and received by the first signal processing apparatus is ab12, the ratio is ab11/ab12.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Figure 13:
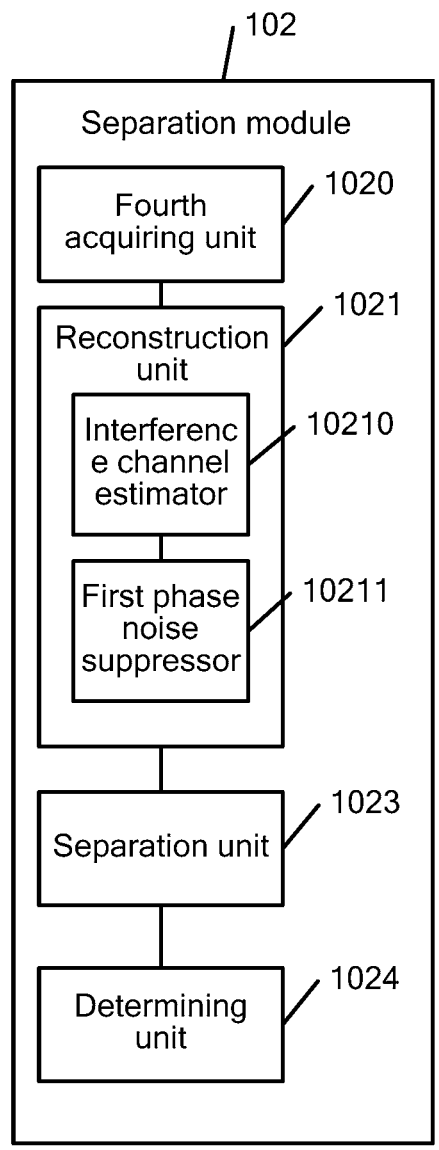
FIG. 13 is a schematic structural diagram of a separation module according to the present disclosure.

Refer to FIG. 13, which is a schematic structural diagram of the separation module in the signal processing apparatus provided in this embodiment of the present disclosure. The separation module 102 may include a fourth acquiring unit 1020, a reconstruction unit 1021, a separation unit 1022, and a determining unit 1023.

The fourth acquiring unit 1020 is configured to: if the energy strength ratio is less than the first preset threshold, acquire the desired reference signal corresponding to the second signal source.

In a specific embodiment, if the energy strength ratio is less than the first preset threshold, it indicates that the interference signal has relatively strong interference to the desired signal. The first preset threshold may be obtained by adding 10 dB to a threshold of a receiving signal to noise ratio of the first signal processing apparatus (the threshold may be obtained through querying according to a specific encoding mode in the communications system).

The interference signal may be the signal sent by the second signal source and received by the first signal processing apparatus, and the fourth acquiring unit 1020 in the first signal processing apparatus may acquire, from a signal processing apparatus receiving the desired signal sent by the second signal source, the desired reference signal corresponding to the second signal source. It should be noted that, the desired reference signal corresponding to the second signal source may be a signal obtained after coding and modulation processing is performed on the desired signal sent by the second signal source, where a waveform of the signal obtained after the coding and modulation processing is the same as a waveform of the signal sent by the second signal source, and only modulation parameters of the signals are different.

The reconstruction unit 1021 is configured to perform interference reconstruction on the desired reference signal corresponding to the second signal source, to obtain the interference signal sent by the second signal source.

In a specific embodiment, the reconstruction unit 1021 in the first signal processing apparatus performs interference reconstruction on the acquired desired reference signal corresponding to the second signal source, to obtain the interference signal sent by the second signal source. Specifically, referring to FIG. 14, a process in which the reconstruction unit 1021 performs interference reconstruction on the desired reference signal corresponding to the second signal source may be: first providing the desired reference signal corresponding to the second signal source to an interference channel estimator in the reconstruction unit 1021, such as a signal S1 and a signal S2 in the figure, separately controlling the signal S1 and the signal S2 to enter two interference channel estimators, and performing, by the interference channel estimator, interference channel estimation on a channel between the second signal source and the first signal processing apparatus, so as to re-establish the signal sent by the second signal source and received by the first signal processing apparatus, that is, the interference signal sent by the second signal source in the mixed signal. Then, a signal obtained after processing of the interference channel estimator enters a first phase noise suppressor in the reconstruction unit 1021, to perform phase deviation adjustment, so as to reduce phase noise and a phase shift in the signal obtained after the interference channel processing. It should be noted that, the interference channel estimator may be implemented by using multiple algorithms, for example, a least mean square (LMS) algorithm or a recursive least square (RLS) algorithm, and the first phase noise suppressor may be implemented by using a phase tracking algorithm such as a phase locked loop (PLL) algorithm. After processing of the interference channel estimator and the first phase noise suppressor, the interference signal sent by the second signal source may be obtained.

Further, the reconstruction unit includes the interference channel estimator 10210 and the first phase noise suppressor 10211.

The interference channel estimator 10210 is configured to process, by using a preset interference channel reconstruction algorithm, the desired reference signal corresponding to the second signal source, to obtain a reconstructed interference signal.

In a specific embodiment, the interference channel estimator 10210 performs interference reconstruction on the desired reference signal by using the preset interference channel reconstruction algorithm, to obtain the reconstructed interference signal. It should be noted that the preset interference channel reconstruction algorithm may be a least mean square algorithm LMS or a recursive least square algorithm RLS. The interference channel estimator inputs the processed signal to the first phase noise suppressor.

The first phase noise suppressor 10211 is configured to process the reconstructed interference signal by using a preset phase tracking algorithm, so as to remove phase noise from the reconstructed interference signal and obtain the interference signal sent by the second signal source.

In a specific embodiment, the first phase noise suppressor 10211 processes the reconstructed interference signal by using a phase tracking algorithm, for example, a phase locked loop algorithm PLL, to remove the phase noise from the reconstructed interference signal, that is, adjust a phase deviation in the reconstructed interference signal, so as to obtain the interference signal sent by the second signal source.

The separation unit 1022 is configured to recognize a signal that is the same as the interference signal sent by the second signal source and that is in the mixed signal as the signal sent by the second signal source, and use the signal sent by the second signal source in the mixed signal as an interference signal and separate the interference signal.

In a specific embodiment, the separation unit 1022 in the first signal processing apparatus recognizes, from the mixed signal, a signal the same as the interference signal obtained after interference reconstruction and sent by the second signal source, and the separation unit 1022 in the actual apparatus may be a combined canceller. A specific recognizing process of the separation unit 1022 may be: recognizing a signal having a signal parameter the same as a signal parameter of the interference signal from the mixed signal, where the signal parameter may include a signal amplitude and a signal phase. Then, the separation unit 1022 determines that the recognized signal is the signal sent by the second signal source, and uses the signal sent by the second signal source in the mixed signal as the interference signal and separates the interference signal. A specific recognizing and separation manner may be: performing separation by using a combined canceller in the separation unit 1022. As shown in FIG. 14, the combined canceller recognizes a signal having a signal parameter the same as the signal parameter of the interference signal from the mixed signal, and subtracts the signal from the mixed signal. A mixed signal from which the interference signal is separated is the desired signal that is sent by the first signal source and that the first signal processing apparatus needs to receive, that is, the signal output by the combined canceller in FIG. 14 is the desired signal sent by the first signal source.

The determining unit 1023 is configured to determine that a mixed signal obtained after the separation processing is the desired signal sent by the first signal source.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

Refer to FIG. 14, which is a schematic structural diagram of still another signal processing apparatus according to an embodiment of the present disclosure. As shown in FIG. 14, the signal processing apparatus includes an interference signal estimator, a first phase noise suppressor, a combined canceller, a desired signal equalizer, a second phase noise suppressor, and a decider, where the interference channel estimator is connected to the first phase noise suppressor, the first phase noise suppressor is separately connected to the combined canceller, the desired signal equalizer, and the second phase noise suppressor, the combined canceller is connected to the desired signal equalizer, the desired signal equalizer is separately connected to the combined canceller, the first phase noise suppressor, and the second phase noise suppressor, and the second phase noise suppressor is separately connected to the decider and the first phase noise suppressor.

In a specific embodiment, the combined canceller in this embodiment may be the separation unit in the foregoing embodiment.

A desired reference signal, that is, S1 and S2 in the figure, corresponding to a second signal source is input to the interference channel estimator and the phase noise suppressor to re-establish an interference signal, to obtain the interference signal sent by the second signal source. A mixed signal and the interference signal that is sent by the second signal source are input to the combined canceller for processing, so as to obtain a desired signal sent by a first signal source. The interference channel estimator performs interference reconstruction on the desired reference signal by using a preset interference channel reconstruction algorithm, to obtain a reconstructed interference signal. It should be noted that, the preset interference channel reconstruction algorithm may be a least mean square algorithm LMS or a recursive least square algorithm RLS. The interference channel estimator inputs the processed signal to the phase noise suppressor. The phase noise suppressor processes the reconstructed interference signal by using a phase tracking algorithm, for example, a phase locked loop algorithm PLL, to remove phase noise from the reconstructed interference signal, to obtain the interference signal sent by the second signal source. Then, the mixed signal and the reconstructed interference signal that is sent by the second signal source are input to the combined canceller, and the combined canceller recognizes a signal having a signal parameter the same as a signal parameter of the interference signal from the mixed signal, to subtract the signal from the mixed signal. A mixed signal from which the interference signal is separated is the desired signal that is sent by the first signal source and that the first signal processing apparatus needs to receive, that is, the signal output by the combined canceller in FIG. 14 is the desired signal sent by the first signal source.

The desired signal equalizer is configured to perform channel equalization processing on the desired signal sent by the first signal source, to cancel intersymbol interference in the desired signal sent by the first signal source.

In a specific embodiment, further, a multi-level modulation signal corresponding to the desired signal sent by the first signal source needs to be obtained, and then, the desired signal sent by the first signal source is input to the desired signal equalizer to perform channel equalization, so as to reduce intersymbol interference in the desired signal. The desired signal equalizer performs, by using a channel equalization coefficient, channel equalization processing on the desired signal sent by the first signal source.

The second phase noise suppressor is configured to adjust a phase deviation of the desired signal obtained after the channel equalization processing and sent by the first signal source, to obtain a desired signal after phase adjustment.

In a specific embodiment, the signal obtained after the channel equalization processing may be input to the second phase noise suppressor to adjust the phase deviation, so as to reduce phase noise in the desired signal obtained after channel equalization processing and sent by the first signal source. As shown in FIG. 14, a signal obtained after the desired signal equalizer performs channel equalization processing enters the second phase noise suppressor, to adjust the phase deviation of the signal and obtain the desired signal after the phase adjustment. It should be noted that there may be a phase drift in a signal transmission process; therefore, the phase deviation needs to be adjusted.

The decider is configured to compare the desired signal obtained after the phase adjustment with a signal of a standard constellation diagram, convert the desired signal obtained after the phase adjustment into preset multi-level modulation data, and output an error signal between the desired signal obtained after the phase adjustment and the signal of the standard constellation diagram.

In a specific embodiment, decision processing may be performed on the desired signal obtained after the phase adjustment, to obtain a preset multi-level modulation signal. A specific processing process may be: inputting the desired signal obtained after the phase adjustment to the decider to perform decision, so that the decider compares the desired signal sent by the second signal source with the signal of the standard constellation diagram. A specific comparison manner may be: performing sampling on the desired signal to obtain multiple sampling points, comparing an amplitude and a phase of each sampling point with those of each constellation point on the standard constellation diagram, selecting a multi-level modulation symbol corresponding to a constellation point nearest to the constellation point on the standard constellation diagram, and determining that the multi-level modulation symbol is a multi-level modulation symbol of the sampling point. Because the amplitude and phase of the sampling point of the desired signal do not completely overlap with those of the constellation point of the standard constellation diagram, there may be an error signal, the error signal is acquired, and the error signal is fed back to the desired signal equalizer and the second phase noise suppressor. The signal is fed back to the second phase noise suppressor as an input for phase extracting, and the error signal is fed back to the desired signal equalizer by means of an unwinding operation.

The desired signal equalizer is further configured to update the channel equalization coefficient according to the error signal, and perform, according to the updated channel equalization coefficient, channel equalization processing on the desired signal sent by the first signal source, to reduce an error between the desired signal obtained after the phase adjustment and the signal of the standard constellation diagram.

In a specific embodiment, the signal equalizer in the first signal processing apparatus configures and updates the coefficient according to the error signal, so as to reduce the error between the desired signal obtained after the phase adjustment and the signal of the standard constellation diagram, so that the desired signal overlaps with the constellation point on the standard constellation diagram as much as possible. Specifically, as shown in FIG. 14, the error signal enters the desired signal equalizer by means of an unwinding operation and is used as an input for coefficient updating, so as to update the channel equalization coefficient in the desired signal equalizer. Then, the desired signal equalizer performs, according to the updated channel equalization coefficient, channel equalization processing on the desired signal sent by the first signal source, so as to reduce a decision error. It should be noted that, this process is performing continuous iteration until the error is the smallest.

The second phase noise suppressor is further configured to determine that the error signal is a phase update deviation, and adjust, according to the phase update deviation, a phase deviation of the desired signal obtained after the channel equalization processing and sent by the first signal source, so as to reduce the error between the desired signal obtained after the phase adjustment and the signal of the standard constellation diagram.

In a specific embodiment, the second phase noise suppressor in the first signal processing apparatus determines that the error signal is a phase update error, where the phase update error indicates that there is a phase deviation between the desired signal obtained after the phase adjustment and the signal of the standard constellation diagram; therefore, the first signal processing apparatus may use the phase update deviation as a reference, and adjust, according to the phase update deviation, the phase deviation of the desired signal obtained after the channel equalization processing and sent by the first signal source, so that the decision error is smaller. It should be noted that this process is performing continuous iteration until the error is the smallest.

Figure 15:
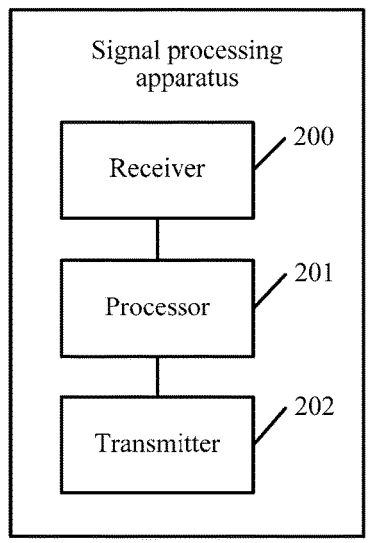
FIG. 15 is a schematic structural diagram of still another signal processing apparatus according to the present disclosure.

Refer to FIG. 15, which is a schematic structural diagram of still another signal processing apparatus according to an embodiment of the present disclosure. The signal processing apparatus may include a receiver 200, a processor 201, and a transmitter 202, where the receiver 200 and the transmitter 202 are both connected to the processor 201.

The receiver 200 is configured to receive a mixed signal.

Optionally, the mixed signal may include a desired signal that is sent by a first signal source and that the signal processing apparatus needs to receive, and may also include an interference signal sent by a second signal source and received by the signal processing apparatus, and further, the interference signal may also include a noise signal. The second signal source may be all signal sources except the first signal source.

The processor 201 is configured to acquire an energy strength ratio according to the mixed signal received by the receiver 200, where the energy strength ratio includes a ratio of energy strength of a signal sent by the first signal source and received by the signal processing apparatus to energy strength of a signal sent by the second signal source and received by the signal processing apparatus.

Optionally, a specific manner in which the processor 201 acquires the energy strength ratio may be: the processor 201 obtains the energy strength ratio through calculation according to energy strength in the mixed signal and an isolation between a first signal processing apparatus and a second signal processing apparatus. The signal sent by the first signal source may be the desired signal that the first signal processing apparatus needs to receive, the signal sent by the second signal source may be the interference signal received by the first signal processing apparatus, and a degree of impact of the interference signal on the desired signal may be acquired according to the ratio of the energy strength of the desired signal to the energy strength of the interference signal. When the interference signal has a relatively high degree of impact on the desired signal, the energy strength ratio is relatively small; when the interference signal has a relatively low degree of impact on the desired signal, the energy strength ratio is relatively large.

The processor 201 is further configured to: if the energy strength ratio is less than a first preset threshold, use the signal sent by the second signal source in the mixed signal as an interference signal and separate the interference signal, and determine that a mixed signal obtained after the separation processing is the desired signal sent by the first signal source.

Optionally, the first preset threshold is determined by a user according to an actual case, and the first preset threshold may be obtained by adding 10 dB to a threshold of a receiving signal to noise ratio of the first signal processing apparatus.

In an optional implementation manner, the processor 201 is further configured to acquire the energy strength of the mixed signal, where the energy strength of the mixed signal may be power of the mixed signal, or may be energy of the mixed signal.

The processor 201 is further configured to acquire an isolation of the second signal source relative to the first signal source.

Optionally, a manner in which the processor 201 acquires the isolation of the second signal source relative to the first signal source may be: still using FIG. 2 as an example for description herein, turn on a first signal source B2, turn off signal sources B1 and B3, turn on an outdoor unit ODU1 of an antenna A1, detect that energy strength of a received signal is C1, turn on an outdoor unit ODU2 of an antenna A2, detect that energy strength of the received signal is C2, turn on an outdoor unit ODU3 of an antenna A3, and detect that energy strength of the received signal is C3, and therefore, when the second signal processing apparatus is the antenna A2, an isolation of the antenna A2 relative to the antenna A1 is G1, where G1=C2−C1; and turn on a first signal source B3, turn off signal sources B1 and B2, turn on an outdoor unit ODU1 of the antenna A1, detect that energy strength of a received signal is C4, turn on an outdoor unit ODU2 of the antenna A2, detect that energy strength of the received signal is C5, turn on an outdoor unit ODU3 of the antenna A3, and detect that energy strength of the received signal is C6, and therefore when the second signal processing apparatus is the antenna A3, an isolation of the antenna A3 relative to the antenna A1 is G2, where G2=C6−C4.

The processor 201 is further configured to calculate, according to the energy strength of the mixed signal and the isolation, the energy strength of the signal sent by the first signal source and received by the signal processing apparatus and the energy strength of the signal sent by the second signal source and received by the signal processing apparatus.

Optionally, a specific calculation method may be: assuming that the energy strength of the mixed signal is P, the isolation of the antenna A2 relative to the antenna A1 is G1, energy strength of a desired reference signal corresponding to the second signal source, that is, a desired reference signal corresponding to the antenna B2, is Q, the energy strength of the signal sent by the first signal source and received by the first signal processing apparatus is ab11, and the energy strength of the signal sent by the second signal source and received by the first signal processing apparatus is ab12, where the variables P, G1, and Q are known and the variables ab11 and ab12 are unknown, calculation is performed according to the parameters. Specific calculation steps are: calculating the variable ab12, where ab12=Q−G1, and because the isolation G1 remains unchanged, ab22−ab12 in the antenna A2 is identically equal to G1, where the energy strength of the desired reference signal corresponding to the second signal source is ab22; and then, subtracting, from the energy strength of the mixed signal, the energy strength ab12 of the signal sent by the second signal source and received by the first signal processing apparatus, to obtain the energy strength ab11 of the signal sent by the first signal source and received by the first signal processing apparatus, where ab11=P−ab12.

The processor 201 is further configured to calculate the ratio of the energy strength of the signal sent by the first signal source and received by the signal processing apparatus to the energy strength of the signal sent by the second signal source and received by the signal processing apparatus.

In an optional implementation manner, the receiver 200 is further configured to: if the energy strength ratio is less than the first preset threshold, acquire the desired reference signal corresponding to the second signal source, where the desired reference signal corresponding to the second signal source is a signal obtained after coding and modulation processing is performed on the desired signal sent by the second signal source.

Optionally, the desired reference signal corresponding to the second signal source may be the signal obtained after coding and modulation processing is performed on the desired signal sent by the second signal source, where a waveform of the signal obtained after the coding and modulation processing is the same as a waveform of the signal sent by the second signal source, and only modulation parameters of the signals are different.

The processor 201 is further configured to perform interference reconstruction on the desired reference signal corresponding to the second signal source, to obtain the interference signal sent by the second signal source.

Optionally, a process in which the processor 201 performs interference reconstruction on the desired reference signal corresponding to the second signal source may be: first providing the desired reference signal corresponding to the second signal source to an interference channel estimator, such as a signal S1 and a signal S2 in the figure, separately controlling the signal S1 and the signal S2 to enter two interference channel estimators, and performing, by the interference channel estimator, interference channel estimation on a channel between the second signal source and the first signal processing apparatus, so as to re-establish the signal sent by the second signal source and received by the first signal processing apparatus, that is, the interference signal sent by the second signal source in the mixed signal. A signal obtained after processing of the interference channel estimator enters a first phase noise suppressor, to perform phase deviation adjustment, so as to reduce phase noise and a phase shift in the signal obtained after the interference channel processing. It should be noted that, the interference channel estimator may be implemented by using multiple algorithms, for example, a least mean square (LMS) algorithm or a recursive least square (RLS) algorithm, and the phase noise suppressor may be implemented by using a phase tracking algorithm such as a phase locked loop (PLL) algorithm. After processing of the interference channel estimator and the first phase noise suppressor, the interference signal sent by the second signal source may be obtained.

The processor 201 is further configured to recognize a signal that is the same as the interference signal sent by the second signal source and that is in the mixed signal as the signal sent by the second signal source, and use the signal sent by the second signal source in the mixed signal as an interference signal and separate the interference signal.

Optionally, the processor 201 recognizes, from the mixed signal, a signal the same as the interference signal obtained after the interference reconstruction and sent by the second signal source. It should be noted that, the signal may be a signal having a same signal parameter, or may be a signal having a same waveform.

In an optional implementation manner, the processor 201 is further configured to process, by using a preset interference channel reconstruction algorithm, the desired reference signal corresponding to the second signal source, to obtain a reconstructed interference signal.

In an optional implementation manner, the processor 201 is further configured to process the reconstructed interference signal by using a preset phase tracking algorithm, so as to remove phase noise from the reconstructed interference signal and obtain the interference signal sent by the second signal source.

In an optional implementation manner, the processor 201 is further configured to acquire a bit error rate of the desired signal sent by the second signal source.

Optionally, the processor 201 may specifically acquire the bit error rate from a target signal processing apparatus. The target signal processing apparatus stores the desired reference signal corresponding to the second signal source and used for interference reconstruction and the bit error rate of the desired signal sent by the second signal source. To check whether the desired reference signal corresponding to the second signal source and stored in the target signal processing apparatus is available, the processor 201 acquires, from the target signal processing apparatus, the bit error rate of the desired signal sent by the second signal source. If the bit error rate of the desired signal sent by the second signal source is relatively large, it indicates that the desired reference signal corresponding to the second signal source in the target signal processing apparatus is unavailable; if the bit error rate of the desired signal sent by the second signal source is relatively small, it indicates that the desired reference signal corresponding to the second signal source in the target signal processing apparatus is available.

The processor 201 is further configured to: if the bit error rate is less than a second preset threshold, acquire the desired reference signal corresponding to the second signal source.

Optionally, when the bit error rate, stored in the target signal processing apparatus, of the desired signal sent by the second signal source is less than the second preset threshold, it indicates that the desired reference signal corresponding to the second signal source and stored in the target signal processing apparatus is available.

In an optional implementation manner, the receiver 200 is further configured to receive the desired reference signal sent by the target signal processing apparatus and corresponding to the second signal source.

Optionally, the target signal processing apparatus may also be an antenna apparatus, and the target signal processing apparatus mainly receives the desired signal sent by the second signal source, and also receives the interference signal sent by the first signal source. The target signal processing apparatus stores the desired reference signal corresponding to the second signal source and the bit error rate of the desired signal sent by the second signal source.

In an optional implementation manner, the processor 201 is further configured to perform coding and modulation on the desired signal sent by the first signal source, to obtain a desired reference signal corresponding to the first signal source.

Optionally, the processor 201 performs demodulation and decoding on the desired signal sent by the first signal source, and then performs coding and modulation again, to obtain the desired reference signal corresponding to the first signal source, where the desired reference signal is used to perform interference reconstruction when the first signal source is an interference signal source, to re-establish the interference signal sent by the first signal source. Further, the processor 201 may calculate a bit error rate of the desired signal sent by the first signal source, where the bit error rate may be used to determine whether the desired reference signal corresponding to the first signal source is available.

The transmitter 202 is configured to send the desired reference signal corresponding to the first signal source to the target signal processing apparatus, so that the target signal processing apparatus performs interference reconstruction on the desired reference signal corresponding to the first signal source, to obtain the interference signal sent by the first signal source, and the target signal processing apparatus separates, from a mixed signal received by the target signal processing apparatus, a signal the same as the interference signal sent by the first signal source.

Optionally, the target signal processing apparatus may be all signal processing apparatuses except the local signal processing apparatus. The desired reference signal corresponding to the first signal source and the bit error rate of the desired signal sent by the first signal source may be used by the target signal processing apparatus to construct the interference signal sent by the first signal source. The target signal processing apparatus separates, from the received mixed signal, a signal the same as the reconstructed interference signal sent by the first signal source, to obtain the desired signal sent by the second signal source.

In an optional implementation manner, the processor 201 is further configured to perform channel equalization processing on the desired signal sent by the first signal source, to cancel intersymbol interference in the desired signal corresponding to the first signal source.

Optionally, a specific processing method used by the first signal processing apparatus to perform channel equalization processing on the desired signal sent by the first signal source may be: processing, by using a desired signal equalizer, the desired signal sent by the first signal source. As shown in FIG. 14, a desired signal equalizer performs, by using a channel equalization coefficient, channel equalization processing on the desired signal sent by the first signal source, so that intersymbol interference in the desired signal sent by the first signal source may be canceled after the channel equalization processing.

In an optional implementation manner, the processor 201 is further configured to adjust a phase deviation of the desired signal obtained after the channel equalization processing and sent by the first signal source, to obtain a desired signal after phase adjustment.

Optionally, the desired signal obtained after the channel equalization processing and sent by the first signal source may also enter a phase noise suppressor to adjust the phase deviation, so as to reduce phase noise in the signal. As shown in FIG. 14, a signal obtained after the desired signal equalizer performs channel equalization processing enters a second phase noise suppressor, to adjust the phase deviation of the signal and obtain the desired signal after the phase adjustment. It should be noted that there may be a phase drift in a signal transmission process; therefore, the phase deviation needs to be adjusted.

In an optional implementation manner, the processor 201 is further configured to compare the desired signal obtained after the phase adjustment with a signal of a standard constellation diagram, convert the desired signal obtained after the phase adjustment into preset multi-level modulation data, and output an error signal between the desired signal obtained after the phase adjustment and the signal of the standard constellation diagram.

Optionally, the desired signal obtained after the phase adjustment may be input to a decider to perform decision, so that the decider compares the desired signal sent by the second signal source with the signal of the standard constellation diagram. A specific comparison manner may be: performing sampling on the desired signal to obtain multiple sampling points, comparing an amplitude and a phase of each sampling point with those of each constellation point on the standard constellation diagram, selecting a multi-level modulation symbol corresponding to a constellation point nearest to the constellation point on the standard constellation diagram, and determining that the multi-level modulation symbol is a multi-level modulation symbol of the sampling point. Because the amplitude and phase of the sampling point of the desired signal do not completely overlap with those of the constellation point on the standard constellation diagram, there may be an error signal, and the error signal is acquired.

In an optional implementation manner, the processor 201 is further configured to update a channel equalization coefficient according to the error signal, and perform, according to the updated channel equalization coefficient, channel equalization processing on the desired signal sent by the first signal source, to reduce an error between the desired signal obtained after the phase adjustment and the signal of the standard constellation diagram.

Optionally, the error signal enters the desired signal equalizer by means of an unwinding operation and is used as an input for coefficient updating, so as to update a channel equalization coefficient in the desired signal equalizer. Then, the desired signal equalizer performs, according to the updated channel equalization coefficient, channel equalization processing on the desired signal sent by the first signal source, so as to reduce a decision error. It should be noted that, this process is performing continuous iteration until the error is the smallest.

In an optional implementation manner, the processor 201 is further configured to determine that the error signal is a phase update deviation, and adjust, according to the phase update deviation, a phase deviation of the desired signal obtained after the channel equalization processing and sent by the first signal source, so as to reduce the error between the desired signal obtained after the phase adjustment and the signal of the standard constellation diagram.

Optionally, the phase update error indicates that there is a phase deviation between the desired signal obtained after the phase adjustment and the signal of the standard constellation diagram; therefore, the first signal processing apparatus may use the phase update deviation as a reference, and adjust, according to the phase update deviation, the phase deviation of the desired signal obtained after the channel equalization processing and sent by the first signal source, so that the decision error is smaller. It should be noted that this process is performing continuous iteration until the error is the smallest.

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a random access memory (RAM).

In this embodiment of the present disclosure, a first signal processing apparatus acquires a ratio of energy strength of a signal sent by a first signal source to energy strength of a signal sent by a second signal source in a received mixed signal, and when the energy strength ratio is less than a preset threshold, that is, the energy strength of the interference signal sent by the second signal source is relatively large, the interference signal is separated from the mixed signal, to obtain the desired signal sent by the first signal source. In this signal processing method, sending power of a desired signal does not need to be reduced; therefore, receiving quality of the desired signal is not affected, and the method is practical. In addition, in this signal processing method, only when an interference signal is relatively strong, the interference signal is separated from the mixed signal; therefore, the signal processing efficiency is high.

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A signal processing method, comprising:
receiving, by a first signal processing apparatus, a mixed signal;
acquiring, by the first signal processing apparatus, an energy strength ratio according to the mixed signal, wherein the energy strength ratio comprises a ratio of energy strength of a signal sent by a first signal source and received by the first signal processing apparatus to energy strength of a signal sent by a second signal source and received by the first signal processing apparatus;
in response to determining that the energy strength ratio is less than a first preset threshold, using, by the first signal processing apparatus, the signal sent by the second signal source as an interference signal, and separating the interference signal from the mixed signal; and
determining that a signal obtained after separating the interference signal from the mixed signal is a desired signal sent by the first signal source;
wherein the acquiring, by the first signal processing apparatus, the energy strength ratio according to the mixed signal comprises:
acquiring, by the first signal processing apparatus, energy strength of the mixed signal;
acquiring, by the first signal processing apparatus, an isolation of the first signal processing apparatus relative to a second signal processing apparatus, wherein the second signal processing apparatus is a processing apparatus that acquires a desired signal sent by the second signal source;
acquiring, by the first signal processing apparatus, energy strength of a desired reference signal corresponding to the second signal source, wherein the desired reference signal corresponding to the second signal source is a signal obtained after coding and modulation processing is performed on the desired signal sent by the second signal source;
calculating, by the first signal processing apparatus according to the energy strength of the mixed signal, the isolation, and the energy strength of the desired reference signal corresponding to the second signal source, the energy strength of the signal sent by the first signal source and received by the first signal processing apparatus and the energy strength of the signal sent by the second signal source and received by the first signal processing apparatus; and
calculating, by the first signal processing apparatus, the ratio of the energy strength of the signal sent by the first signal source and received by the first signal processing apparatus to the energy strength of the signal sent by the second signal source and received by the first signal processing apparatus.

2. The method according to claim 1, wherein the using, by the first signal processing apparatus, the signal sent by the second signal source in the mixed signal as the interference signal and separating the interference signal from the mixed signal comprises:
acquiring, by the first signal processing apparatus, a desired reference signal corresponding to the second signal source;
performing, by the first signal processing apparatus, interference reconstruction on the desired reference signal corresponding to the second signal source, to obtain the interference signal sent by the second signal source; and
recognizing, by the first signal processing apparatus, a signal that is the same as the interference signal sent by the second signal source and that is in the mixed signal as the signal sent by the second signal source, and using the signal sent by the second signal source in the mixed signal as the interference signal and separating the interference signal.

3. The method according to claim 2, wherein the performing, by the first signal processing apparatus, the interference reconstruction on the desired reference signal corresponding to the second signal source, to obtain the interference signal sent by the second signal source comprises:
processing, by the first signal processing apparatus by using a preset interference channel reconstruction algorithm, the desired reference signal corresponding to the second signal source, to obtain a reconstructed interference signal; and
processing, by the first signal processing apparatus, the reconstructed interference signal by using a preset phase tracking algorithm, so as to remove phase noise from the reconstructed interference signal and obtain the interference signal sent by the second signal source.

4. The method according to claim 2, wherein before the acquiring, by the first signal processing apparatus, the desired reference signal corresponding to the second signal source, the method further comprises:
acquiring, by the first signal processing apparatus, a bit error rate of a desired signal sent by the second signal source; and
in response to determining that the bit error rate is less than a second preset threshold, acquiring, by the first signal processing apparatus, the desired reference signal corresponding to the second signal source.

5. The method according to claim 2, wherein the acquiring, by the first signal processing apparatus, the desired reference signal corresponding to the second signal source comprises:

receiving, by the first signal processing apparatus, the desired reference signal sent by a second signal processing apparatus and corresponding to the second signal source.

6. The method according to claim 5, wherein after the determining, by the first signal processing apparatus, that the mixed signal obtained after separating the interference signal from the mixed signal is the desired signal sent by the first signal source, the method further comprises:

performing, by the first signal processing apparatus, coding and modulation on the desired signal sent by the first signal source, to obtain a desired reference signal corresponding to the first signal source; and sending, by the first signal processing apparatus, the desired reference signal corresponding to the first signal source to the second signal processing apparatus, so that the second signal processing apparatus performs interference reconstruction on the desired reference signal corresponding to the first signal source, to obtain an interference signal sent by the first signal source, and the second signal processing apparatus separates, from a mixed signal received by the second signal processing apparatus, a signal the same as the interference signal sent by the first signal source.

7. The method according to claim 1, further comprising:

performing, by the first signal processing apparatus, channel equalization processing on the desired signal sent by the first signal source, so as to cancel intersymbol interference in the desired signal sent by the first signal source;

adjusting, by the first signal processing apparatus, a phase deviation of the desired signal obtained after the channel equalization processing and sent by the first signal source, to obtain a desired signal after phase adjustment;

comparing, by the first signal processing apparatus, the desired signal obtained after the phase adjustment with a signal of a standard constellation diagram, converting the desired signal obtained after the phase adjustment into preset multi-level modulation data, and outputting an error signal between the desired signal obtained after the phase adjustment and the signal of the standard constellation diagram;

updating, by the first signal processing apparatus, a channel equalization coefficient according to the error signal, and performing, according to the updated channel equalization coefficient, channel equalization processing on the desired signal sent by the first signal source, to reduce an error between the desired signal obtained after the phase adjustment and the signal of the standard constellation diagram; and determining, by the first signal processing apparatus, that the error signal is a phase update deviation, and adjusting, according to the phase update deviation, a phase deviation of the desired signal obtained after the channel equalization processing and sent by the first signal source, so as to reduce the error between the desired signal obtained after the phase adjustment and the signal of the standard constellation diagram.

8. A signal processing apparatus, comprising:
a receiver; and
a processor,
wherein the receiver is configured to receive a mixed signal; and
wherein the processor is configured to:
acquire an energy strength ratio according to the mixed signal, wherein the energy strength ratio comprises a ratio of energy strength of a signal sent by a first signal source and received by the signal processing apparatus to energy strength of a signal sent by a second signal source and received by the signal processing apparatus, in response to determining that the energy strength ratio is less than a first preset threshold, use a signal sent by the second signal source in the mixed signal as an interference signal, and separate the interference signal from the mixed signal, determine that a signal obtained after separating the interference signal from the mixed signal a desired signal sent by the first signal source, acquire energy strength of the mixed signal, acquire an isolation of the local signal processing apparatus relative to a target signal processing apparatus, wherein the target signal processing apparatus is a processing apparatus that acquires a desired signal sent by the second signal source, acquire energy strength of a desired reference signal corresponding to the second signal source, wherein the desired reference signal corresponding to the second signal source is a signal obtained after coding and modulation processing is performed on the desired signal sent by the second signal source, calculate, according to the energy strength of the mixed signal, the isolation, and the energy strength of the desired reference signal corresponding to the second signal source, the energy strength of the signal sent by the first signal source and received by the signal processing apparatus and the energy strength of the signal sent by the second signal source and received by the signal processing apparatus, and calculate the ratio of the energy strength of the signal sent by the first signal source and received by the signal processing apparatus to the energy strength of the signal sent by the second signal source and received by the signal processing apparatus.

9. The signal processing apparatus according to claim 8, wherein the receiver is further configured to:
in response to determining that the energy strength ratio is less than the first preset threshold, acquire a desired reference signal corresponding to the second signal source; and
wherein the processor is further configured to:
perform interference reconstruction on the desired reference signal corresponding to the second signal source, to obtain the interference signal sent by the second signal source; and
recognize a signal that is the same as the interference signal sent by the second signal source and that is in the mixed signal as the signal sent by the second signal source, and use the signal sent by the second signal source in the mixed signal as the interference signal and separate the interference signal from the mixed signal.

10. The signal processing apparatus according to claim 9, wherein the processor is further configured to:
process, by using a preset interference channel reconstruction algorithm, the desired reference signal corresponding to the second signal source, to obtain a reconstructed interference signal; and
process the reconstructed interference signal by using a preset phase tracking algorithm, so as to remove phase noise from the reconstructed interference signal and obtain the interference signal sent by the second signal source.

11. The signal processing apparatus according to claim 9, wherein the processor is further configured to:
- acquire a bit error rate of the desired signal sent by the second signal source; and
- in response to determining that the bit error rate is less than a second preset threshold, acquire the desired reference signal corresponding to the second signal source.

12. The signal processing apparatus according to claim 9, wherein the receiver is further configured to receive the desired reference signal sent by the target signal processing apparatus and corresponding to the second signal source.

13. The signal processing apparatus according to claim 12, further comprising:
- a transmitter,
    - wherein the processor is further configured to perform coding and modulation on the desired signal sent by the first signal source, to obtain a desired reference signal corresponding to the first signal source; and
    - wherein the transmitter is configured to send the desired reference signal corresponding to the first signal source to the target signal processing apparatus, so that the target signal processing apparatus performs interference reconstruction on the desired reference signal corresponding to the first signal source, to obtain an interference signal sent by the first signal source, and the target signal processing apparatus separates, from the mixed signal received by the target signal processing apparatus, a signal the same as the interference signal sent by the first signal source.

14. The signal processing apparatus according to claim 8, wherein the processor is further configured to:
- perform channel equalization processing on the desired signal sent by the first signal source, to cancel intersymbol interference in the desired signal sent by the first signal source;
- adjust a phase deviation of the desired signal obtained after the channel equalization processing and sent by the first signal source, to obtain a desired signal after phase adjustment;
- compare the desired signal obtained after the phase adjustment with a signal of a standard constellation diagram, convert the desired signal obtained after the phase adjustment into preset multi-level modulation data, and output an error signal between the desired signal obtained after the phase adjustment and the signal of the standard constellation diagram;
- update the channel equalization coefficient according to the error signal, and perform, according to the updated channel equalization coefficient, channel equalization processing on the desired signal sent by the first signal source, to reduce an error between the desired signal obtained after the phase adjustment and the signal of the standard constellation diagram; and
- determine that the error signal is a phase update deviation, and adjust, according to the phase update deviation, a phase deviation of the desired signal obtained after the channel equalization processing and sent by the first signal source, so as to reduce the error between the desired signal obtained after the phase adjustment and the signal of the standard constellation diagram.

* * * * *